US011564858B2

(12) United States Patent
Park et al.

(10) Patent No.: US 11,564,858 B2
(45) Date of Patent: Jan. 31, 2023

(54) WALKING ASSISTANCE METHOD AND WALKING ASSISTANCE APPARATUS PERFORMING THE SAME

(71) Applicant: Samsung Electronics Co., Ltd., Suwon-si (KR)

(72) Inventors: Youngjin Park, Seoul (KR); Seungyong Hyung, Yongin-si (KR); Hyun Do Choi, Yongin-si (KR); Jusuk Lee, Suwon-si (KR)

(73) Assignee: Samsung Electronics Co., Ltd., Gyeonggl-Do (KR)

( * ) Notice: Subject to any disclaimer, the term of this patent is extended or adjusted under 35 U.S.C. 154(b) by 656 days.

(21) Appl. No.: 16/656,015

(22) Filed: Oct. 17, 2019

(65) Prior Publication Data
US 2020/0197253 A1    Jun. 25, 2020

(30) Foreign Application Priority Data

Dec. 21, 2018 (KR) .................. 10-2018-0167702

(51) Int. Cl.
*A61H 3/00*    (2006.01)

(52) U.S. Cl.
CPC ..... *A61H 3/008* (2013.01); *A61H 2201/1463* (2013.01); *A61H 2201/165* (2013.01); *A61H 2201/5071* (2013.01); *A61H 2205/12* (2013.01)

(58) Field of Classification Search
None
See application file for complete search history.

(56) References Cited

U.S. PATENT DOCUMENTS

| | | | |
|---|---|---|---|
| 7,431,707 B2 | 10/2008 | Ikeuchi | |
| 8,251,930 B2 | 8/2012 | Ido | |
| 9,668,888 B2 | 6/2017 | Herr et al. | |
| 2009/0048686 A1* | 2/2009 | Ikeuchi | A61H 3/008 623/53 |

(Continued)

FOREIGN PATENT DOCUMENTS

| | | |
|---|---|---|
| JP | 2007-054086 A | 3/2007 |
| JP | 4645391 B2 | 3/2011 |
| KR | 10-0939284 B1 | 1/2010 |

OTHER PUBLICATIONS

Luke M. Mooney et al., "Autonomous exoskeleton reduces metabolic cost of human walking during load carriage", Journal of NeuroEngineering and Rehabilitation, 2014, 11:80, https://www.jneuroengrehab.com/content/11/1/80.

(Continued)

*Primary Examiner* — Samchuan C Yao
*Assistant Examiner* — Nathan M Le
(74) *Attorney, Agent, or Firm* — Harness, Dickey & Pierce, P.L.C.

(57) ABSTRACT

Provided is a walking assistance method and apparatus for providing an assistance torque to an ankle of a user. To provide an assistance torque to an ankle of a user, a first pressure value and a second pressure value are received from a first pressure sensor and a second pressure sensor, a ratio between the first pressure value and the second pressure value is calculated, a gain value is determined based on the ratio, an assistance torque value is calculated based on the ratio and the gain value, and a driver is controlled to output the assistance torque value.

20 Claims, 28 Drawing Sheets

(56) References Cited

U.S. PATENT DOCUMENTS

| | | | |
|---|---|---|---|
| 2013/0226048 A1* | 8/2013 | Unluhisarcikli | A61H 1/0244 |
| | | | 601/34 |
| 2016/0147841 A1* | 5/2016 | Gray | A43B 3/34 |
| | | | 600/595 |
| 2018/0360347 A1* | 12/2018 | Lim | A61H 3/00 |
| 2020/0085666 A1 | 3/2020 | Seo et al. | |
| 2020/0146592 A1* | 5/2020 | Tsukada | A61B 5/742 |
| 2020/0179215 A1* | 6/2020 | Lerner | A61F 5/0123 |

OTHER PUBLICATIONS

J. N. Son et. al., "Design of ground reaction force sensor system" Korean Society of Precision Engineering, Accessed Oct. 22, 2018, http://www.dbpia.co.kr/Article/NODE01752380.

\* cited by examiner

WALKING ASSISTANCE METHOD AND WALKING ASSISTANCE APPARATUS PERFORMING THE SAME

CROSS-REFERENCE TO RELATED APPLICATION

This application claims under 35 U.S.C. § 119 to Korean Patent Application No. 10-2018-0167702, filed on Dec. 21, 2018, in the Korean Intellectual Property Office, the entire contents of which are incorporated herein by reference in their entirety.

BACKGROUND

1. Field

At least one example embodiment relates to a method and/or apparatus for assisting walking of a user. For example, at least some example embodiments relate to a method and/or apparatus for providing an assistance torque to assist walking when a user walks.

2. Description of the Related Art

With the onset of aging societies, a growing number of people experience inconvenience and pain in walking due to reduced muscular strength or malfunctioning joint issues resulting from aging. Thus, interest in a walking assistance apparatus that enables an elderly user or a patient with reduced muscular strength or joint problems to walk with less effort is growing. Also, walking assistance apparatuses for enhancing muscular strength of a human body, for example, for military purposes are being developed.

SUMMARY

Some example embodiments relate to a method of controlling a driver of a walking assistance apparatus.

In some example embodiments, the method may include receiving a first pressure value and a second pressure value from a first pressure sensor and a second pressure sensor, respectively; calculating a ratio between the first pressure value and the second pressure value; determining a gain value based on the ratio; calculating an assistance torque value based on the ratio and the gain value; and controlling the driver of the walking assistance apparatus to output the assistance torque value.

In some example embodiments, the first pressure sensor is associated with a first area of the walking assistance apparatus corresponding to a heel of a foot of a user, and the second pressure sensor is associated with a second area of the walking assistance apparatus corresponding to a ball of the foot of the user.

In some example embodiments, the calculating the ratio includes calculating an initial ratio between the first pressure value and the second pressure value; and calculating a final ratio based on a value and the initial ratio.

In some example embodiments, the calculating the ratio includes masking at least one of the first pressure value and the second pressure value to generate masked pressure values; and calculating a ratio between the masked pressure values.

In some example embodiments, the masking includes comparing the second pressure value to a third threshold value, and the calculating the ratio between the masked pressure values includes setting the ratio as a default value in response to the second pressure value being less than the third threshold value.

In some example embodiments, the masking further includes comparing the first pressure value to a first threshold value, and the calculating of the ratio between the masked pressure values further includes calculating the ratio between the first pressure value and the second pressure value in response to the first pressure value exceeding the first threshold value.

In some example embodiments, the masking includes comparing the first pressure value to a second threshold value; and setting the first pressure value to be same as the second threshold value in response to the first pressure value being less than the second threshold value.

In some example embodiments, the calculating the ratio between the first pressure value and the second pressure value includes determining whether to apply a first low-pass filter (LPF) to the ratio based on the ratio and a previous ratio to generate a determination result; and calculating a filtered ratio by applying the first LPF to the ratio based on the determination result.

In some example embodiments, the determining the gain value includes determining a target gain value among a plurality of gain values based on the ratio.

In some example embodiments, the calculating the assistance torque value includes determining whether to apply a second LPF to the assistance torque value based on the assistance torque value and a previous assistance torque value to generate a determination result; and calculating a filtered assistance torque value by applying the second LPF to the assistance torque value based on the determination result.

In some example embodiments, the controlling the driver includes setting an output delay time associated with applying the assistance torque value; and controlling the driver to delay outputting the assistance torque value by the delay time.

In some example embodiments, the controlling the driver includes controlling the driver based on an additional assistance torque pattern in response to the assistance torque value being maintained within a range.

In some example embodiments, the controlling the driver includes controlling the driver to flex and extend an ankle of a user of the walking assistance apparatus based on the additional assistance torque pattern.

In some example embodiments, the first pressure sensor and the second pressure sensor are associated with a sole of a foot of a first leg of a user, and the controlling of the driver includes controlling the driver such that the driver assists a second leg of the user, the second leg being different from the first leg.

In some example embodiments, the controlling the driver includes controlling the driver of the walking assistance apparatus to output the assistance torque value to change an angle of an ankle of a user of the walking assistance apparatus.

Some example embodiments relate to a non-transitory computer-readable medium including computer readable instructions that, when executed by a computer, configure the computer to perform a method of controlling a driver of a walking assistance apparatus.

Some example embodiments relate to a walking assistance apparatus configured to provide an assistance torque to an ankle of a user.

In some example embodiments, the walking assistance apparatus includes a memory configured to store a program;

and a processor configured to execute the program to, receive a first pressure value and a second pressure value from a first pressure sensor and a second pressure sensor, respectively, calculate a ratio between the first pressure value and the second pressure value, determine a gain value based on the ratio, calculate an assistance torque value based on the ratio and the gain value, and control a driver to output the assistance torque value such that the assistance torque is provided to the ankle of the user by the driver.

Some example embodiments relate to a walking assistance apparatus configured to assist walking of a user.

In some example embodiments, the walking assistance apparatus includes a first pressure sensor and a second pressure sensor configured to generate a first pressure value and a second pressure value, respectively, by sensing pressure values of a sole of a foot of the user; a processor configured to, calculate a ratio between the first pressure value and the second pressure value, determine a gain value based on the ratio, and calculate an assistance torque value based on the ratio and the gain value; and a driver configured to output the assistance torque value.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
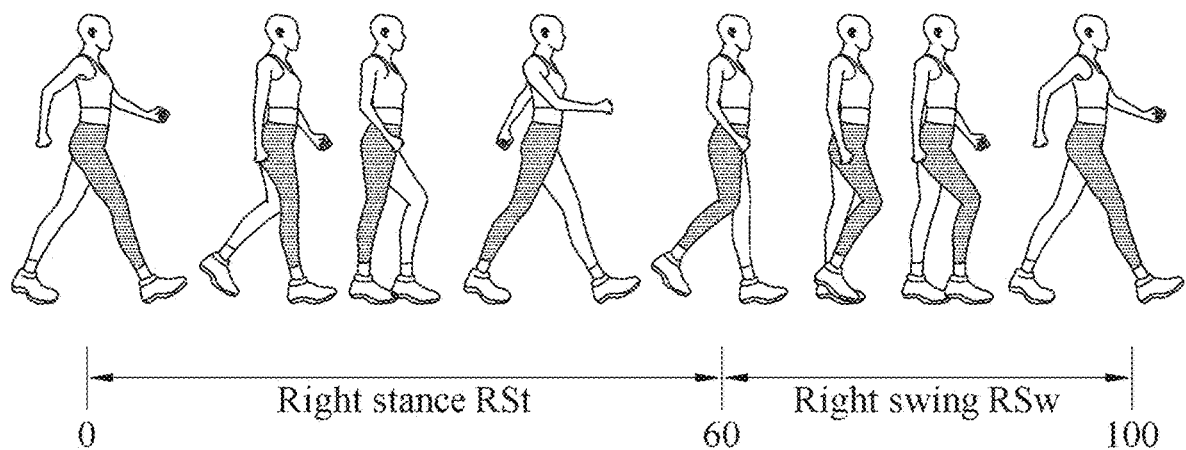
FIG. 1 illustrates a gait state according to at least one example embodiment.

Hereinafter, example embodiments will be described in detail with reference to the accompanying drawings. However, the scope of the present application is not limited to the example embodiments. In the drawings, like reference numerals are used for like elements.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. When it is determined detailed description related to a related known function or configuration they may make the purpose of the example embodiments unnecessarily ambiguous in describing the example embodiments, the detailed description will be omitted here.

FIG. 1 illustrates a gait state according to at least one example embodiment.

Referring to FIG. 1, gait phases of one leg of a user for a gait may be defined (or, alternatively, predefined). For example, the gait phases may include a stance and a swing. Gait phases of a left leg may be classified into a left stance LSt and a left swing LSw. Gait phases of a right leg may be classified into a right stance RSt and a right swing RSw. The term "gait phase" may be interchangeably used with the term "gait state."

A gait cycle associated with gait phases may be mapped to a finite state machine (FSM). For example, a gait cycle of 0% to 60% may be mapped in a time from a point in time at which the stance starts to a point in time at which the stance ends. Also, a gait cycle of 60% to 100% may be mapped in a time from a point in time at which the swing starts to a point in time at which the swing ends.

In one example, the stance and the swing may be sub-divided into a plurality of phases. For example, the stance may be sub-divided into an initial contact, a weight bearing, a middle stance, a terminal stance, and a pre-swing. The swing may be sub-divided into an initial swing, a middle swing, and a terminal swing. However, example embodiments are not limited to the example, and the stance and the swing may be sub-divided in various ways.

As another example, the stance may be sub-divided into a heel strike, a landing response, a mid-stance, a terminal stance, and a pre-swing. Also, the swing may be sub-divided into an initial swing, a mid-swing, and a terminal swing. However, example embodiments are not limited to the example, and the stance and the swing may be sub-divided in various ways.

Figure 2:
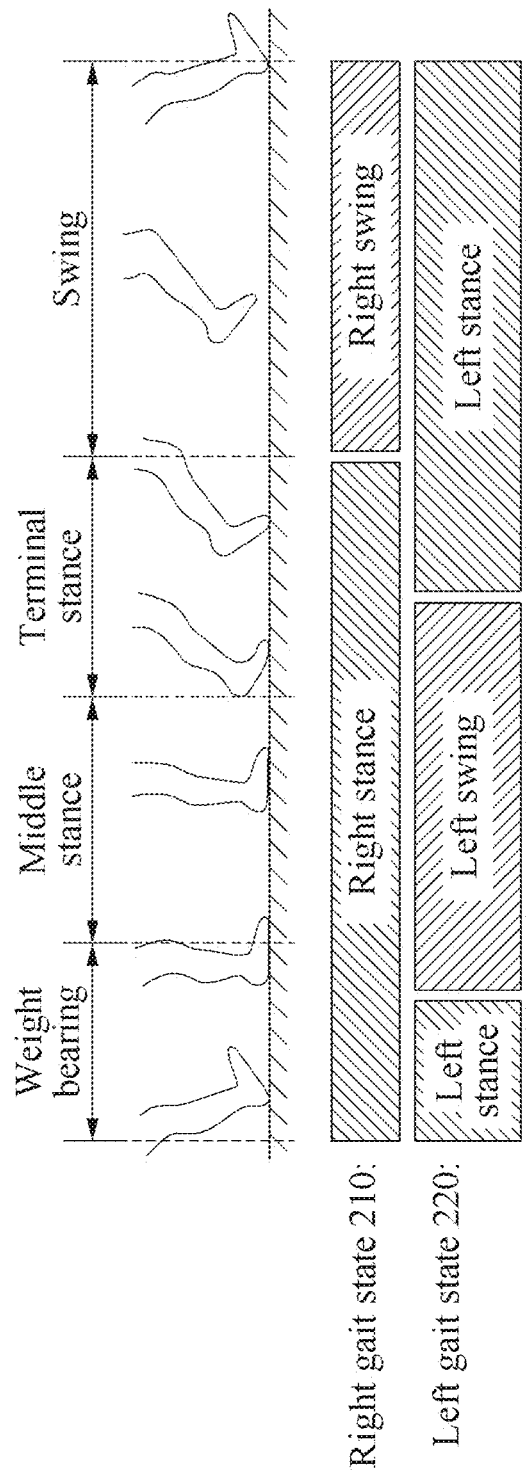
FIG. 2 illustrates a transition between gait states according to at least one example embodiment.

FIG. 2 illustrates a transition between gait states according to at least one example embodiment.

Referring to FIG. 2, according to a general gait mechanism, gait phases of each leg include a stance and a swing, and the stance and the swing are alternately performed for walking.

A right gait state 210 associated with a change 200 of a right leg includes a right stance and a right swing. The stance may include a weight bearing, a middle stance, and a terminal stance, however, is not limited thereto. A left gait state 220 associated with a change of a left leg (not shown) relative to the change 200 of the right leg includes a left stance and a left swing.

A normal transition between gait states may differ based on a gait state at a point in time at which a gait starts. The gait states may be transited in order of the right stance, the left swing, the left stance, and the right swing based on occurrence order of an event indicating a start of each gait state. The right stance is performed again after the right swing.

During the gait phases, an angle of an ankle may be adjusted in response to the progress of the gait phase or a change of the gait phase. For example, during the swing state, the toe end of a foot of the user may be lifted to swing a leg while avoiding the leg from being caught by a floor.

If muscular strength of an ankle of a user is reduced due to aging or diseases of the user, the user may experience discomfort with walking. For example, the user may have difficulty lifting the toe end of their foot.

Therefore, in one or more example embodiments, a walking assistance apparatus may be provided to a user having difficulty in adjusting an angle of an ankle by himself or herself due to the reduced muscular strength of the ankle. The walking assistance apparatus may be worn around the ankle of the user, and output an assist torque to adjust an ankle angle of the user.

The gait mechanism described with reference to FIGS. 1 and 2 is a general description of gait. A conventional walking assistance apparatus may affirmatively determine the gait phase of the user using various sensors such as an inertial measuring unit (IMU) and a joint angle sensor, and control the walking assistance apparatus based on the determined gait phase.

In contrast, a walking assistance method and a walking assistance apparatus according to example embodiments, which will be described hereinafter with reference to FIGS. 3 through 21, may determine the assist torque without necessarily determining a gait phase of a user.

Figure 3:
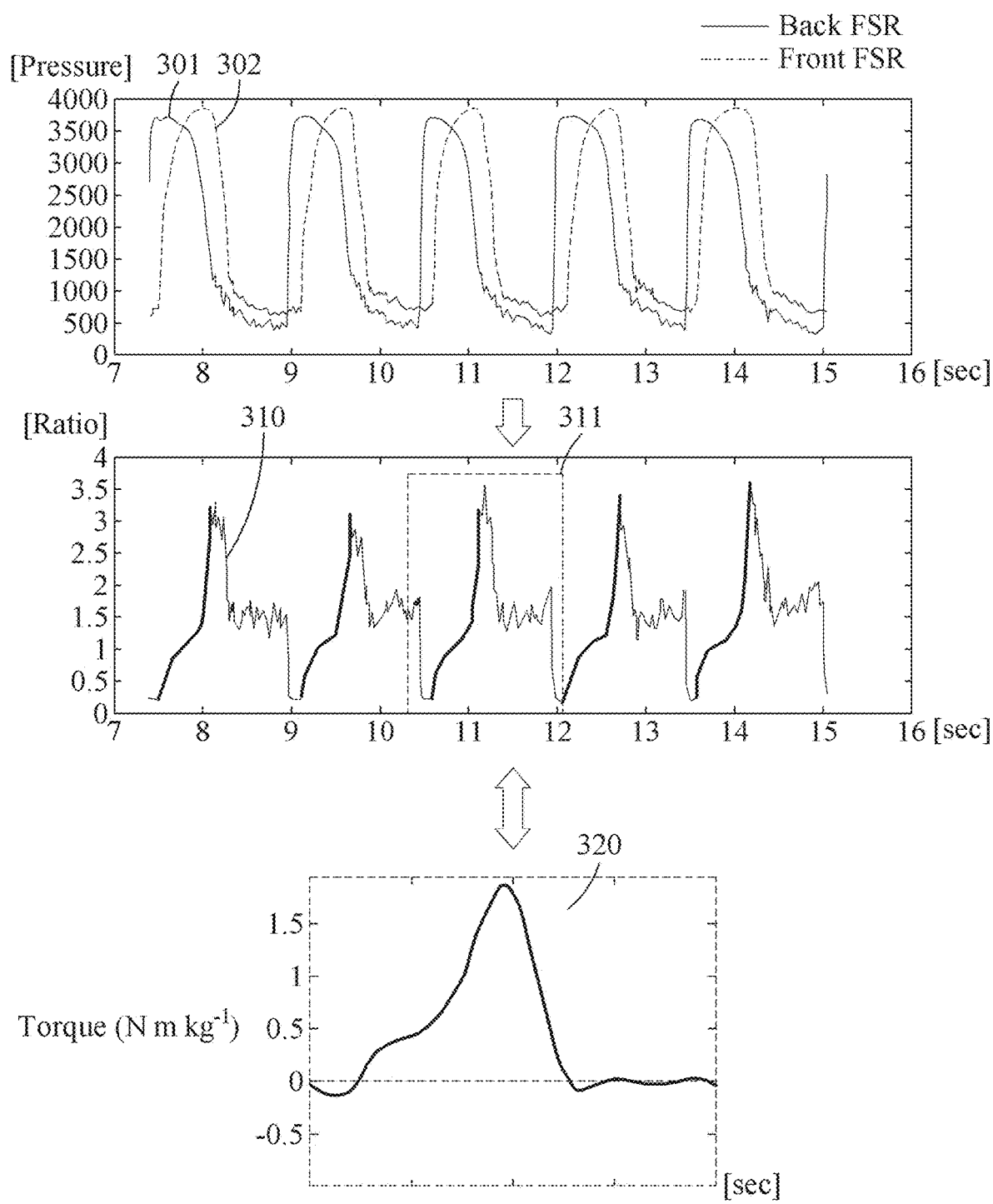
FIG. 3 illustrates a similarity between a trajectory of a ratio between pressure values of a sole of a foot and a trajectory of an ankle assistance torque value according to at least one example embodiment.

FIG. 3 illustrates a similarity between a trajectory of a ratio between pressure values of a sole of a foot and a trajectory of an ankle assistance torque value according to at least one example embodiment.

Referring to FIG. 3, when a user walks, a ratio trajectory 310 between a first trajectory 301 of a pressure value applied to a rear part of a sole of a foot of a user and a second trajectory 302 of a pressure value applied to a front part of the sole of the foot shows a pattern similar to that of a torque trajectory 320 of a torque applied to an ankle (or generated at the ankle). In particular, a rising portion in a first cycle 311 of the ratio trajectory 310 is similar to a rising portion of the torque trajectory 320.

Since the first cycle 311 of the ratio trajectory 310 is similar to the torque trajectory 320, when a ratio between the pressure valued applied to the rear part of the sole of the foot and the pressure value applied to the front part of the sole of the foot is obtained in real time, a torque value necessary for the ankle at a corresponding point in time may be calculated. According to the method, a gait phase of the user may not need to be determined to calculate the torque value. Thus, sensing of information other than the pressure values of the sole of the foot sensed in real time may not be required.

Hereinafter, a method of controlling a driver of a walking assistance apparatus based on a ratio between pressures of a sole of a foot will be described in detail with reference to FIGS. 4 through 21.

Figure 4A:
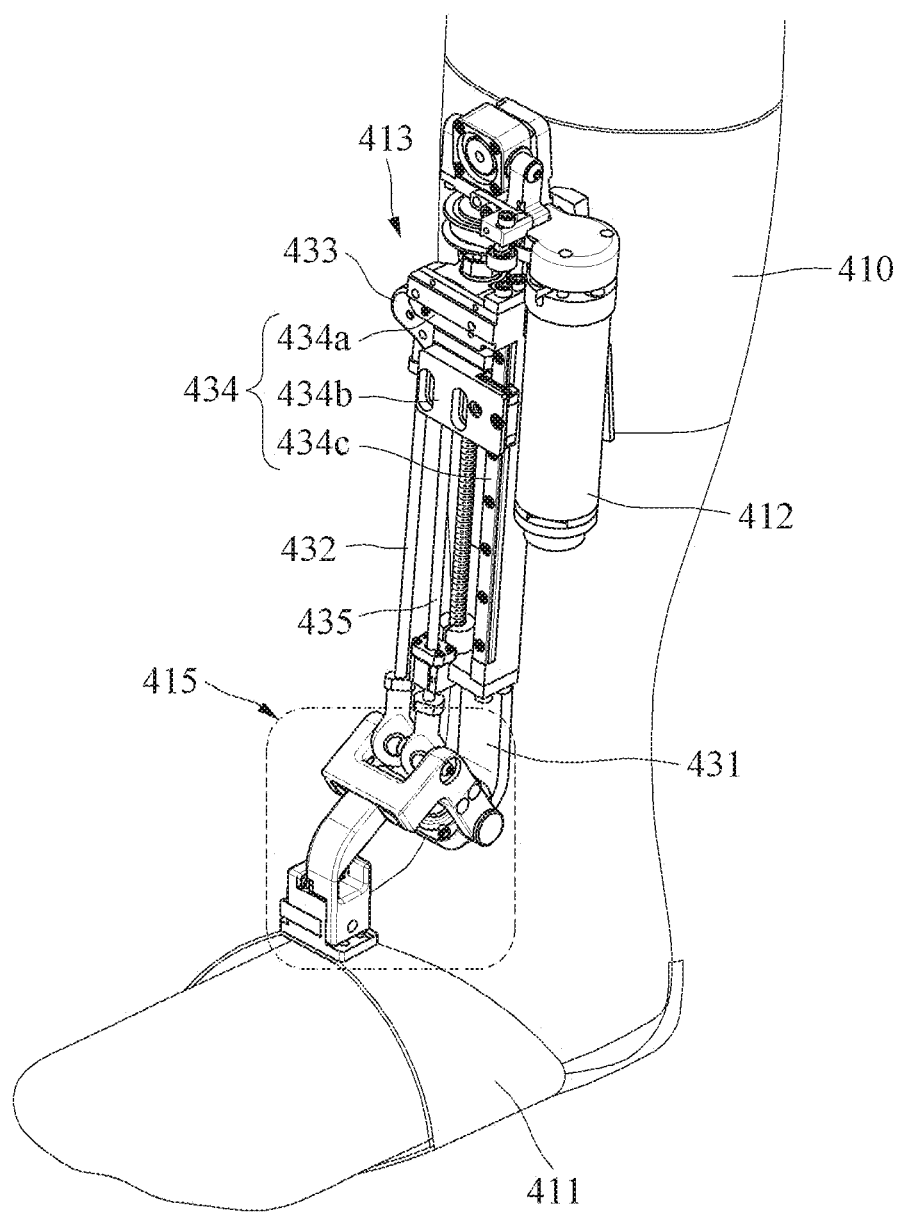
FIG. 4A is a perspective view illustrating an ankle-type walking assistance apparatus according to at least one example embodiment.

FIG. 4A is a perspective view illustrating an ankle-type walking assistance apparatus according to at least one example embodiment.

Referring to FIG. 4A, a walking assistance apparatus 400 may be worn by a user to assist walking of the user. The user may correspond to a human, an animal, or a robot. However, the user is not limited thereto. The walking assistance apparatus 400 may include a proximal support 410, a distal support 411, a driving source 412, a power distributor 413, and a rotary frame 415.

The proximal support 410 and the distal support 411 may be on opposite sides from a joint of the user and support a proximal part and a distal part of the user, respectively. The proximal support 410 and the distal support 411 may be on opposite sides from an ankle of the user. The proximal support 410 may support a part below a knee of the user, for example, a calf of the user, and the distal support 411 may support a part below the ankle of the user, for example, a foot of the user. In detail, the proximal support 410 may include a detachable belt to entirely support a circumference of the calf of the user, and the distal support 411 may be provided in a structure entirely enclosing a top of the foot and a sole of the foot to support the foot of the user.

The driving source 412 may generate a power to drive the power distributor 413. For example, the driving source 412 may be a motor configured to generate a rotational power. As another example, the driving source 412 may be of a wire driving type or a piston-cylinder type to generate a translational power. Hereinafter, an example in which the driving source 412 is a motor will be described.

The power distributor 413 may include a reducer 434 configured to reduce the power received from the driving source 412, a power transmitting member 435 configured to transmit the power from the reducer 434 to the rotary frame 415, a first output terminal 431 and a second output terminal 432 to be driven by receiving the power generated by the driving source 412, and a connecting member 433 configured to connect the first output terminal 431 and the second output terminal 432 such that one of the first output terminal 431 and the second output terminal 432 may move relative to the other.

The reducer 434 may include a ball screw-type transmission mechanism that converts a rotational motion into a translational motion. The reducer 434 may include a bolt portion 434a configured to receive a rotational motion from the driving source 412, a nut portion 434b coupled to the bolt portion 434a and configured to perform a translational motion in a longitudinal direction of the bolt portion 434a in response to a rotation of the bolt portion 434a, and a guide portion 434c configured to guide the nut portion 434b to slide in a vertical direction. As another example, the reducer 434 may include a transmission mechanism that reduces and transmits a translational motion, without converting the translational motion into another form, for example, a movable pulley-type transmission mechanism. However, the type of the reducer 434 is not limited thereto. Hereinafter, an example in which the reducer 434 is of a ball screw type will be described.

The power transmitting member 435 may connect the reducer 434 and the rotary frame 415. For example, the power transmitting member 435 may be a rod that transmits the translational motion of the reducer 434 to the rotary frame 415. The power transmitting member 435 may enable the rotary frame 415 to perform a translational or rotational motion using the power received from the reducer 434.

By means of the connecting member 433, the first output terminal 431 and the second output terminal 432 may move in the same direction at different speeds when the power distributor 413 operates. The speed of the second output terminal 432 may be greater than the speed of the first output terminal 431. For example, the connecting member 433 may be rotatably connected to the first output terminal 431 and the second output terminal 432. In the above structure, two output terminals may move relative to each other. For example, the connecting member 433 may be a longitudinal member which is rotatably fixed to the proximal support 410 with one side enclosing the calf of the user and traverses the part below the knee of the user. In the above structure, the first output terminal 431 may move relative to the proximal support 410 in a vertical direction connecting the knee and the ankle of the user, and likewise, the second output terminal 432 may also move relative to the first output terminal 431 approximately in the vertical direction.

The rotary frame 415 may simultaneously perform a translational motion and a rotational motion relative to the proximal support 410. A first portion of the rotary frame 415 may be connected to the distal support 411 enclosing the top and the sole of the foot on a front side of the ankle of the user, a second portion thereof may be connected to the reducer 434 through the power transmitting member 435, a third portion thereof may be connected to the second output terminal 432, and a fourth portion thereof may be rotatably connected to the first output terminal 431. In the above structure, the rotary frame 415 may rotate about a vicinity of a talocrural joint of the user as a remote center of motion (RCM), without being connected to a configuration disposed on an axis of the talocrural joint of the user. Thus, the rotary frame 415 may implement a motion similar to an actual motion of the talocrural joint of the user.

All movable parts including the power distributor 413 and the rotary frame 415 may be disposed on a front side between the ankle and a forefoot of the user, when the user wears the walking assistance apparatus 400. In a vertical direction, the movable parts may be disposed between the foot and the knee of the user. In the above structure, the walking assistance apparatus 400 may be worn by the user while there is no movable part on a rear side of a lower leg of the user. Further, when the movable parts are disposed on the front side of the lower leg of the user, the user may put on or off typical shoes such as sneakers while wearing the walking assistance apparatus 400, and thus the user convenience may improve.

The driving source 412, the power distributor 413, and the rotary frame 415 may be collectively referred to as a driver.

Figure 4B:
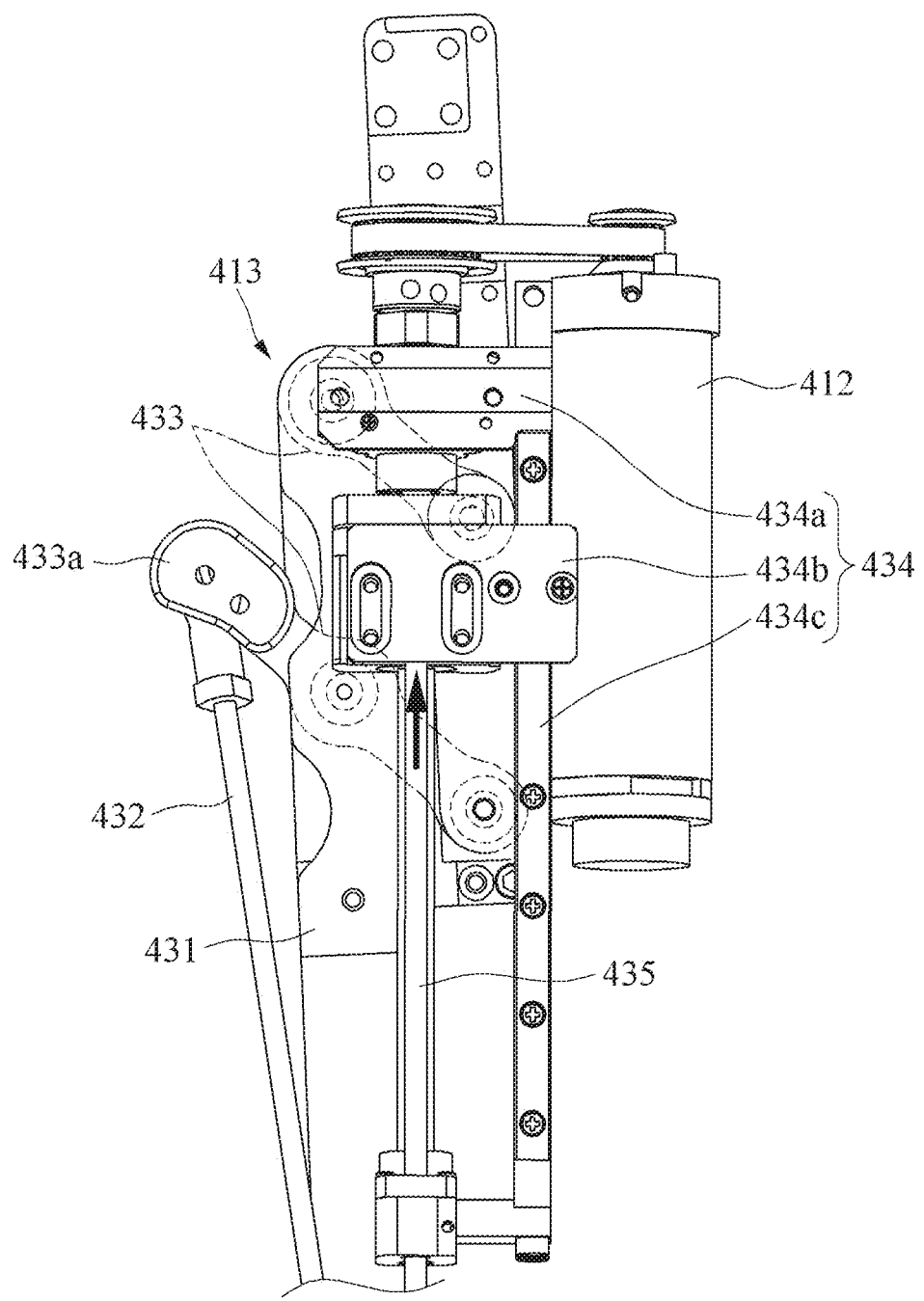
FIG. 4B is a front view of a power distributor when a talocrural joint of a user is in a dorsi-flexion state according to at least one example embodiment.
Figure 4C:
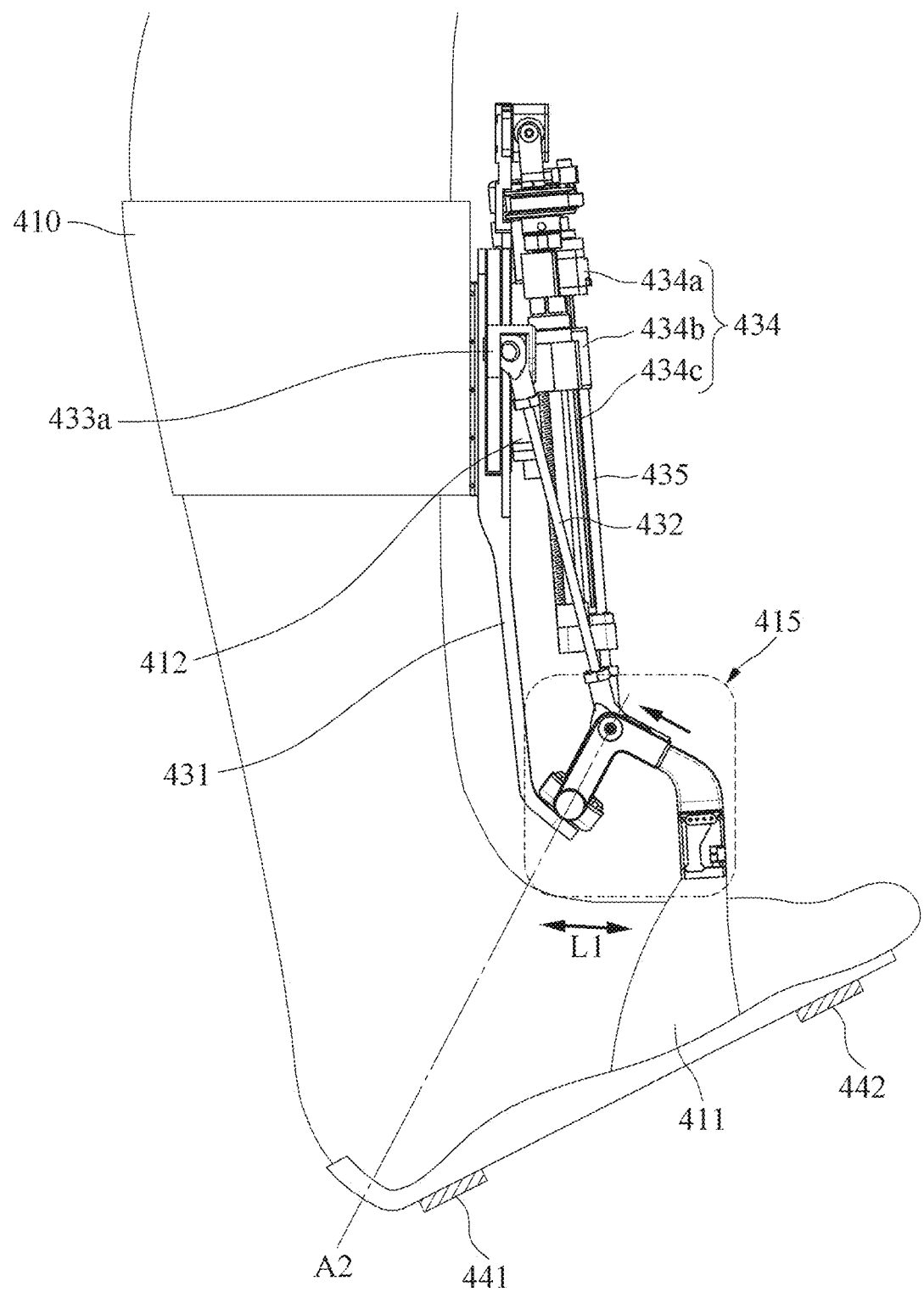
FIG. 4C is a side view of a walking assistance apparatus when a talocrural joint of a user is in a dorsi-flexion state according to at least one example embodiment.

FIG. 4B is a front view of a power distributor when a talocrural joint of a user is in a dorsi-flexion state according to at least one example embodiment, and FIG. 4C is a side view of a walking assistance apparatus when the talocrural joint of the user is in the dorsi-flexion state according to at least one example embodiment.

Referring to FIGS. 4B and 4C, the walking assistance apparatus 400 may include a front pressure sensor 442 disposed on a front side of the sole of the foot to measure a pressure applied to a ball of the sole of the foot, and a rear pressure sensor 441 disposed on a rear side of the sole of the foot to measure a pressure applied to a heel of the user. The rear pressure sensor 441 and the front pressure sensor 442 may be disposed below the distal support 411.

Referring to FIGS. 4B and 4C, when the power distributor 413 is driven, the power transmitting member 435 receiving the power from the reducer 434 may move in a direction of an arrow shown in FIG. 4B, and the second output terminal 432 may move approximately in the direction of the arrow. The first output terminal 431 may be connected to the second output terminal 432 through the connecting member 433, and thus the first output terminal 431 may move in the direction of the arrow, similar to the second output terminal 432.

The connecting member 433 may include, for example, a pair of parallel links each configured to connect the first output terminal 431 and the second output terminal 432. In such a parallelogram four-bar linkage structure, the first output terminal 431 and the second output terminal 432 may slide relative to each other.

A projection 433a to which the second output terminal 432 is connected may be disposed farther from a center of rotation of the connecting member 433 than the first output terminal 431. Thus, the second output terminal 432 may slide at a faster speed than the first output terminal 431 in a direction approximately the same as a direction in which the first output terminal 431 slides. In this example, the first output terminal 431 may perform an upward translational motion relative to the proximal support 410, and the second output terminal 432 may perform an upward translational motion relative to the first output terminal 431.

When the power transmitting member 435 moves upward as in FIGS. 4B and 4C, the first output terminal 431 may move upward, thereby moving an axis of motion A2 of a subtalar joint of the user upward. Since the second output terminal 432 moves upward at a faster speed than the first output terminal 431, the rotary frame 415 connected to the first output terminal 431 may be rotated upward in a counterclockwise direction in the example of FIG. 4C. In this example, the walking assistance apparatus 400 may enable a dorsi-flexion motion of the ankle of the user.

Figure 5:
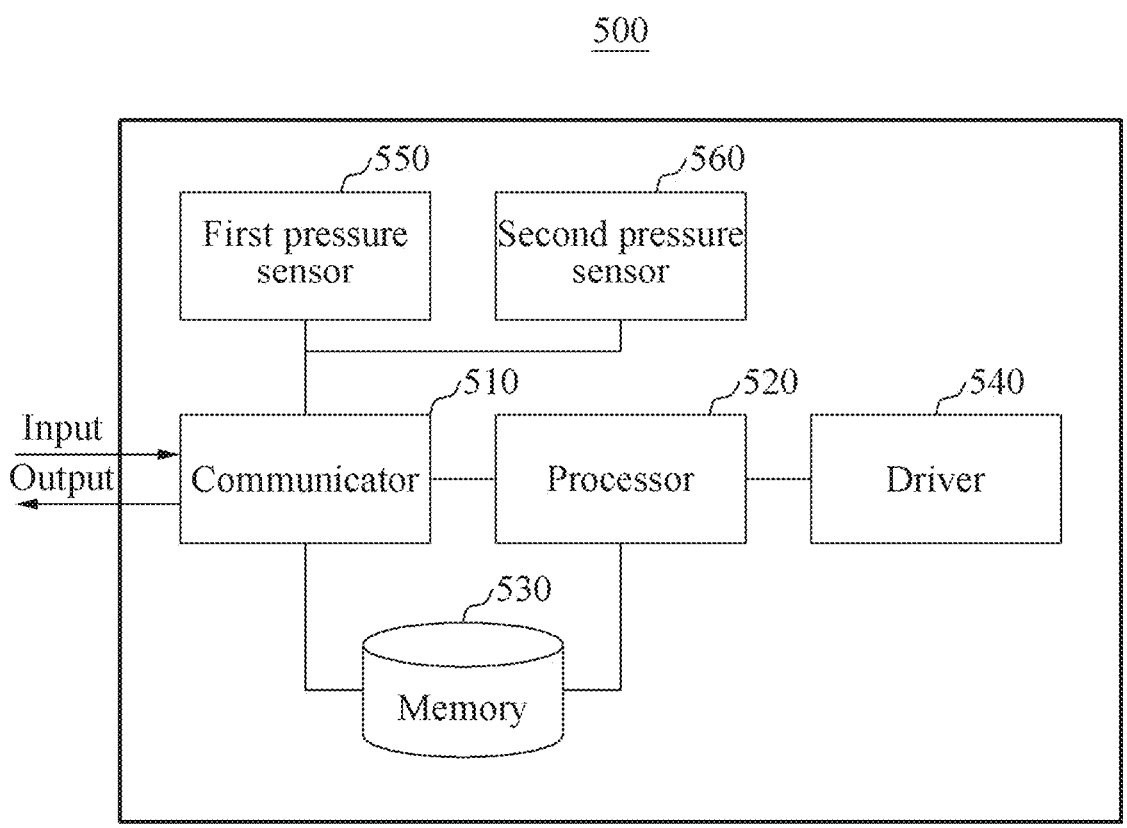
FIG. 5 illustrates a structure of a walking assistance apparatus according to at least one example embodiment.

FIG. 5 illustrates a structure of a walking assistance apparatus according to at least one example embodiment.

Referring to FIG. 5, a walking assistance apparatus 500 may include a communicator 510, a processor 520, a memory 530, a driver 540, a first pressure sensor 550, and a second pressure sensor 560. For example, the walking assistance apparatus 500 may correspond to an electronic device part of the walking assistance apparatus 400 described with reference to FIGS. 4A through 4C.

Each of the first pressure sensor 550 and the second pressure sensor 560 may convert a magnitude of a pressure applied to the pressure sensor into a voltage and output the same.

The communicator 510 may be connected to the first pressure sensor 550, the second pressure sensor 560, the processor 520, and the memory 530 to transmit and receive data. The communicator 510 may be connected to an external device to transmit and receive data. Hereinafter, transmitting and receiving "A" may represent transmitting and receiving "information or data that indicates A."

The communicator 510 may be configured as a circuitry within the walking assistance apparatus 500. For example, the communicator 510 may include an internal bus and an external bus. As another example, the communicator 510 may refer to an element that connects the walking assistance apparatus 500 and the external device. The communicator 510 may be an interface. The communicator 510 may receive data from the external device and transmit the data to the processor 520 and the memory 530.

The processor 520 may process data received by the communicator 510 and data stored in the memory 530. Here, the processor 520 may be a data processing device embodied by hardware including a circuitry having a physical structure to execute desired operations. The operations may include, for example, codes and instructions included in a program. The data processing device embodied by hardware may include, for example, a microprocessor, a central processing unit (CPU), a processor core, a multi-core processor, a multiprocessor, an application-specific integrated circuit (ASIC), and a field programmable gate array (FPGA).

The processor 520 may execute a computer-readable code, for example, software, stored in the memory 530 that transform the processor 520 into a special purpose computer to assist walking of the user. For example, the computer-readable code, when executed, may configure the processor 530 as a special purpose processor to assist walking of the user by calculating an assistance torque value relatively simply using, for example, only a calculated pressure ratio between pressure values and a gain value associated therewith, since a trajectory of a pressure ratio may be similar to a torque trajectory. Therefore, the special purpose processor may improve the functioning of the walking assistance device 500 itself by accurately controlling the walking assistance device 500 without, for example, incurring the costs associated with sensing information associated with determining the gait phase of the user.

The memory 530 may store data received by the communicator 510 and data processed by the processor 520. For example, the memory 530 may store the program. The stored program may be a set of syntaxes that are coded and executable by the processor 520 to assist walking of a user.

The memory 530 may include, for example, at least one volatile memory, nonvolatile memory, random memory access (RAM), flash memory, a hard disk drive, and an optical disk drive.

The memory 530 may store an instruction set, for example, software, for operating the walking assistance apparatus 500. The instruction set for operating the walking assistance apparatus 500 may be executed by the processor 520.

The driver 540 may include mechanical devices configured to adjust an angle of an ankle of the user. For example, the driver 540 may include a motor, and a torque output from the motor may be used to adjust the angle of the ankle of the user. The driver 540 may include the driving source 412 described with reference to FIGS. 4A through 4C.

The communicator 510, the processor 520, the memory 530, the driver 540, the first pressure sensor 550, and the second pressure sensor 560 will be described further below with reference to FIGS. 6 through 21.

Figure 6:
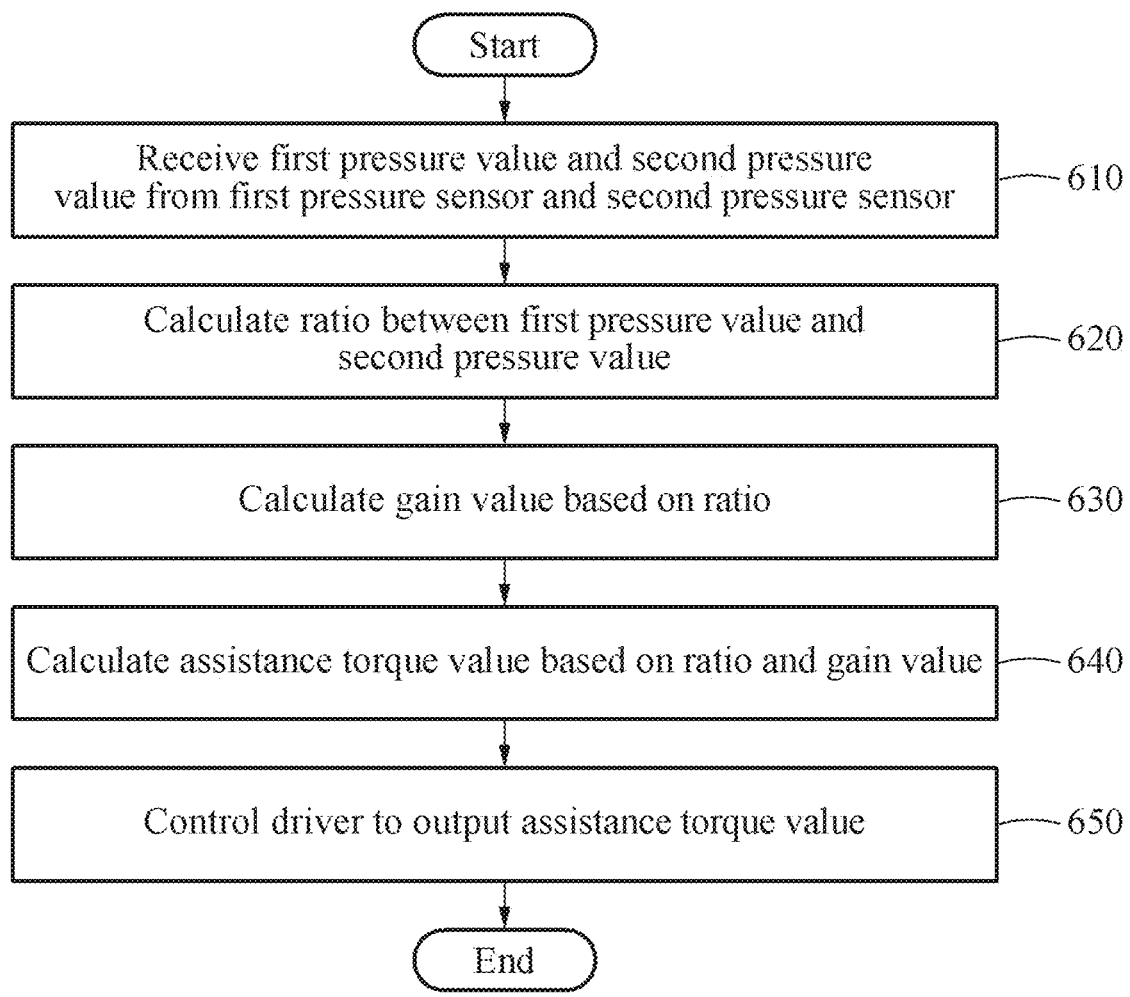
FIG. 6 is a flowchart illustrating a method of controlling a driver of a walking assistance apparatus according to at least one example embodiment.

FIG. 6 is a flowchart illustrating a method of controlling a driver of a walking assistance apparatus according to at least one example embodiment.

Referring to FIG. 6, operations 610 through 650 described below may be performed by the processor 520 of FIG. 5.

In operation 610, the processor 520 may receive a first pressure value and a second pressure value from the first pressure sensor 550 and the second pressure sensor 560, respectively. The first pressure sensor 550 and the second pressure sensor 560 may generate the first pressure value and the second pressure value at operating intervals, and the generated first pressure value and the generated second pressure value may be transmitted to the processor 520 in real time through the communicator 510.

In operation 620, the processor 520 may calculate a ratio between the first pressure value and the second pressure value. For example, the ratio may correspond to second pressure value over first pressure value. An example of calculating the ratio between the first pressure value and the second pressure value will be described further below with reference to FIGS. 8 through 15.

In operation 630, the processor 520 may calculate a gain value based on the calculated ratio. For example, a target gain value may be determined among a plurality of desired (or, alternatively, preset) gain values based on the ratio. The target gain value corresponding to a target ratio section may be preset.

In operation 640, the processor 520 may calculate an assistance torque value based on the ratio and the gain value. For example, the assistance torque value may correspond to a product of the ratio and the gain value. As described above, a ratio trajectory is similar to a torque trajectory of an ankle. Thus, the assistance torque value may be relatively simply calculated using only the ratio and the gain value.

In operation 650, the processor 520 may control the driver 540 to output the assistance torque value. Mechanical elements of the driver 540 may be controlled to output an assistance torque.

Further, nerves of a user may become less sensitive as the user ages such that a threshold level of a minimum stimulus detectable by the user may increase, which may cause difficulty in, for example, walking when the user cannot feel pressure on the sole of their foot As such, in some example embodiments, in addition to controlling the walking assistance device to output the assistance torque value based on the sensed pressure from the pressure sensors 550, 560, the walking assistance device may further include one or more vibrators (not shown), and the method executed by the processor 520 may further include generating a vibration signal having a varying frequency such that at least a portion of the vibration signal resonates along with an external stimulus, and controlling the vibrator based on the vibration signal to allow the user to detect when they should lift their leg to swing to avoid the leg from being caught by a floor.

Figure 7:
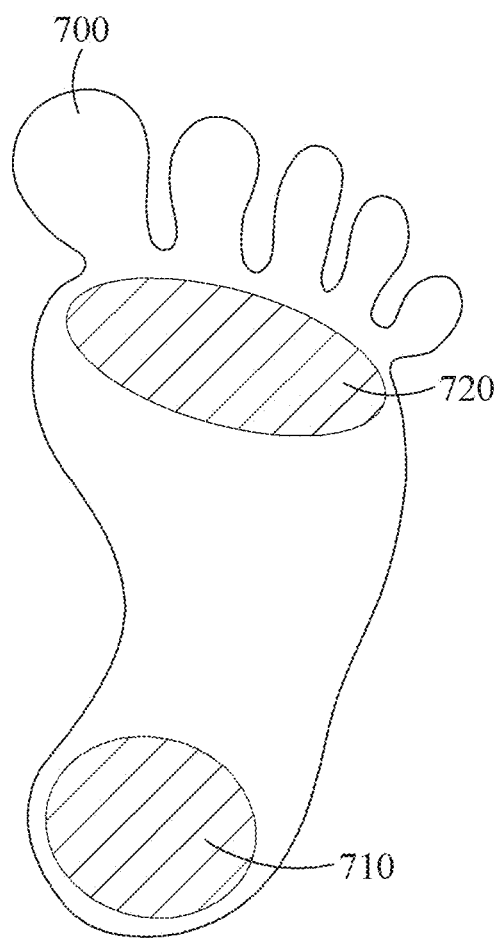
FIG. 7 illustrates a first area and a second area, of a sole of a foot, in which a first pressure sensor and a second pressure sensor are disposed according to at least one example embodiment.

FIG. 7 illustrates a first area and a second area, of a sole of the foot, in which a first pressure sensor and a second pressure sensor are disposed according to at least one example embodiment.

Referring to FIG. 7, the first pressure sensor 550 may be disposed on a rear portion of a sole of a foot 700. For example, the first pressure sensor 550 may be disposed in a first area 710 corresponding to a heel of the foot 700.

The second pressure sensor 560 may be disposed on a front portion of the sole of the foot 700. For example, the second pressure sensor 560 may be disposed in a second area 720 corresponding to a ball of the sole of the foot 700.

According to a gait mechanism, at a swing, a heel strike occurs first, and then a push-off occurs. Thus, the first pressure sensor 550 may be pressed first, and then the second pressure sensor 560 may be pressed.

Figure 8:
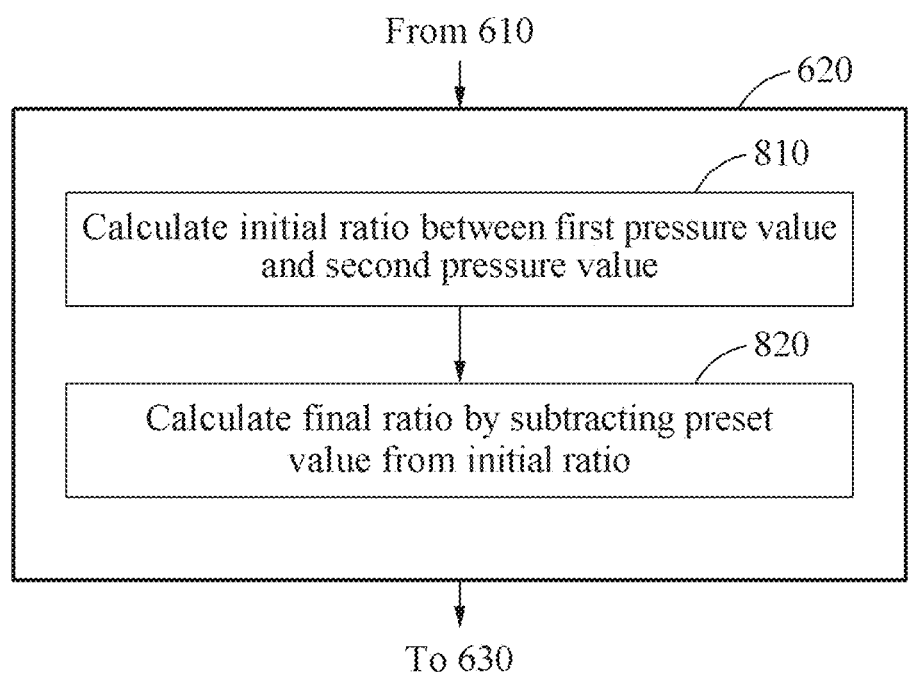
FIG. 8 is a flowchart illustrating an example of calculating a final ratio based on an initial ratio according to at least one example embodiment.

FIG. 8 is a flowchart illustrating an example of calculating a final ratio based on an initial ratio according to at least one example embodiment.

Referring to FIG. 8, operation 620 of FIG. 6 may include operations 810 and 820.

In operation 810, the processor 520 may calculate an initial ratio between the first pressure value and the second pressure value. For example, the initial ratio may be calculated as "1" when the first pressure value and the second pressure value are substantially identical.

In operation 820, the processor 520 may calculate a final ratio by subtracting a preset value from the initial ratio. For example, the preset value may be "1." When the initial ratio is calculated as "1" since the first pressure value and the second pressure value are substantially identical, the final ratio may be calculated as "0."

Since the assistance torque value may be a product of the final ratio and the gain value, the assistance torque value may be "0" if the final ratio is "0." When the assistance torque value is "0," no signal may be applied to the driver 540, and thus the driver 540 may not operate.

For example, if the assistance torque value is a positive number, the driver 540 may be controlled to extend the ankle, and if the assistance torque value is a negative number, the driver 540 may be controlled to flex the ankle.

Figure 9:
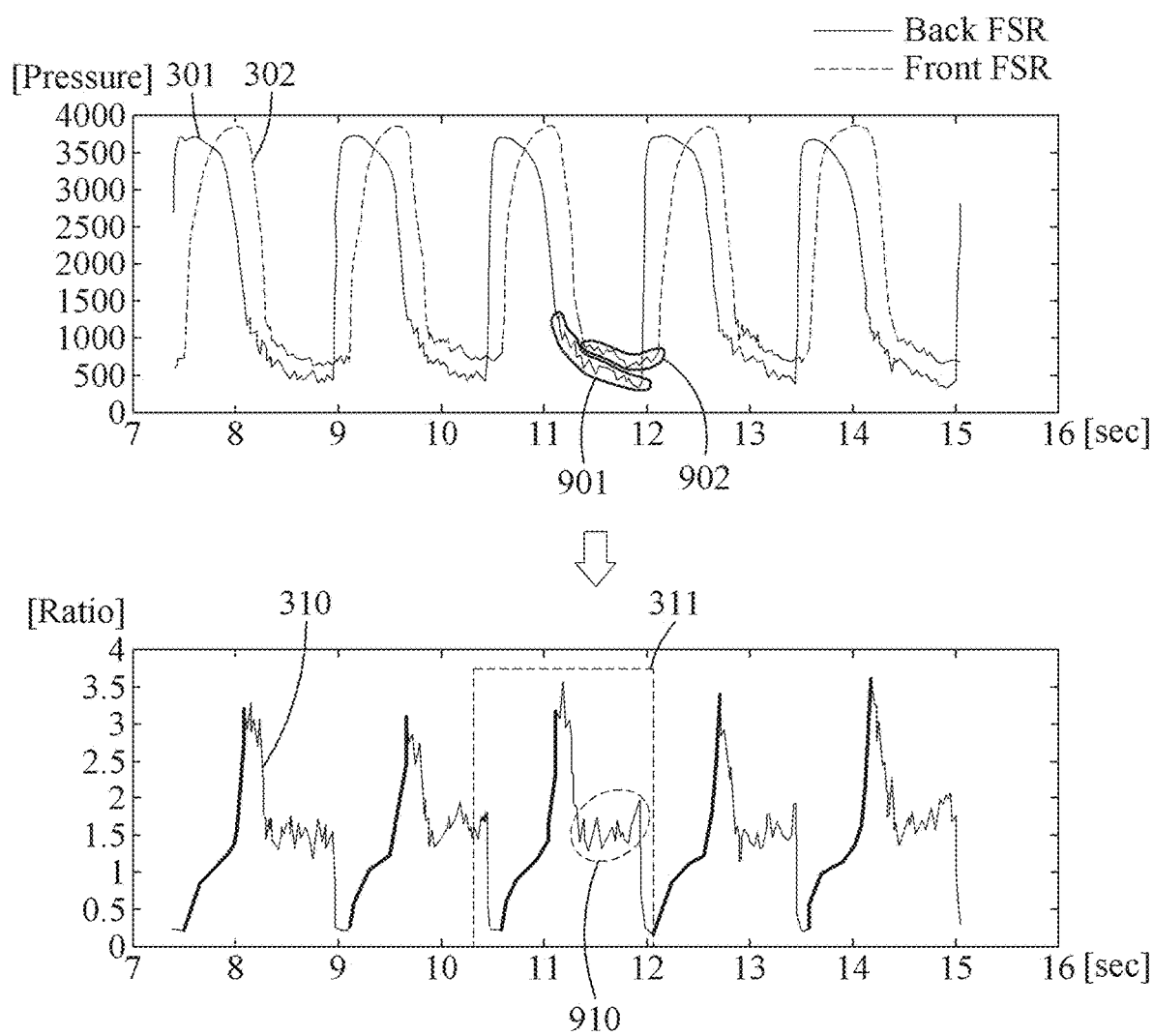
FIG. 9 illustrates a first pressure value, a second pressure value, and a ratio between the pressure values according to at least one example embodiment.

FIG. 9 illustrates a first pressure value, a second pressure value, and a ratio between the pressure values according to at least one example embodiment.

Referring to FIG. 9, when strong pressures are applied to the first pressure sensor 550 and the second pressure sensor 560, definitely high pressure values may be measured, and thus an effect of noise may be negligible. However, when weak pressures or no pressures are applied to the first pressure sensor 550 and the second pressure sensor 560, the generated pressure values may be affected greatly by noise. For example, an effect of noise may be great in a first section 901 in the first trajectory 301 and a second section 902 in the second trajectory 302.

When an effect of noise on the measured pressure values is great, the ratio calculated based on the measured pressure values may also be affected greatly by noise. For example, an effect of noise may be great in a third section 910 in the first cycle 311 of the ratio trajectory 310. An assistance torque value calculated based on the third section 910 may be inconstant and change greatly, and thus the user may feel inconvenience.

By adjusting pressure values affected greatly by noise, a ratio calculated based on the pressure values may be adjusted. A process of adjusting pressure values will be referred to as masking.

Hereinafter, an example of masking pressure values and calculating a ratio based on the masked pressure values will be described in detail with reference to FIGS. 10 through 14.

Figure 10:
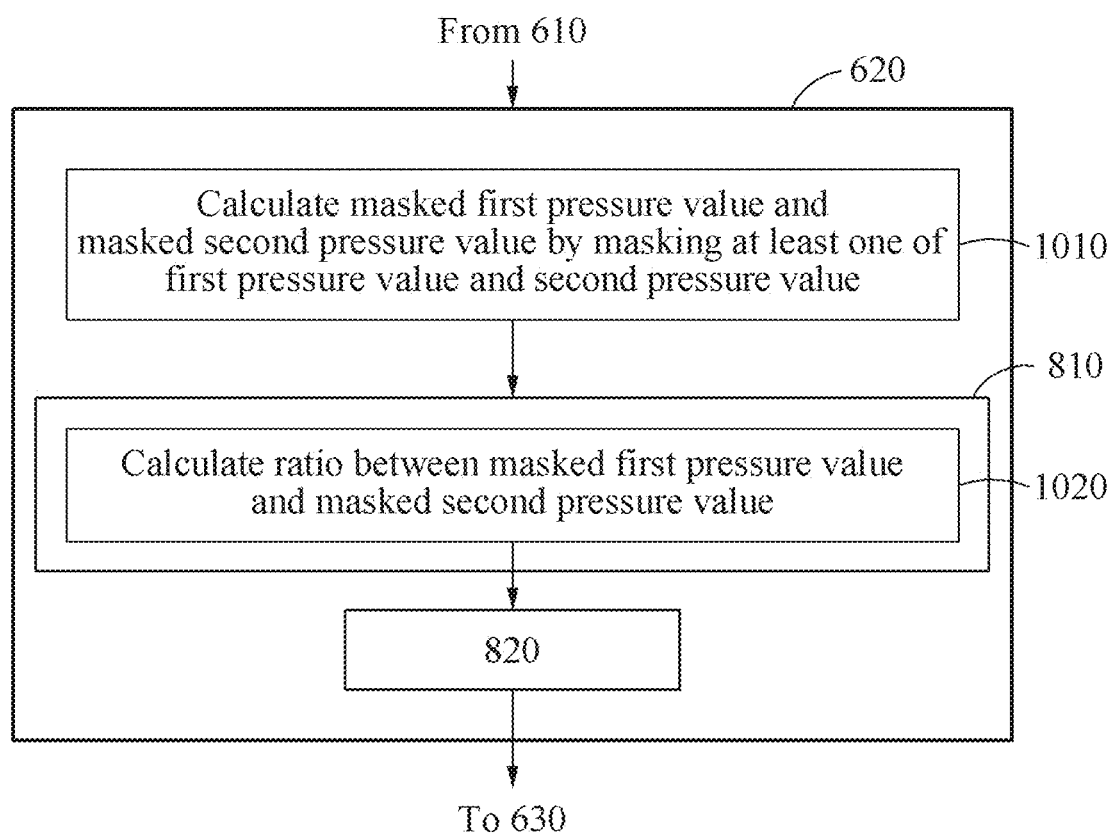
FIG. 10 is a flowchart illustrating an example of determining a ratio between masked pressure values according to at least one example embodiment.

FIG. 10 is a flowchart illustrating an example of determining a ratio between masked pressure values according to at least one example embodiment.

Referring to FIG. 10, operation 620 of FIG. 6 may further include operation 1010.

In operation 1010, the processor 520 may calculate a masked first pressure value and a masked second pressure value by masking at least one of the first pressure value and the second pressure value. An example of masking at least one of the first pressure value and the second pressure value will be described further below with reference to FIGS. 12 and 13.

Operation 810 of FIG. 8 may include operation 1020.

In operation 1020, the processor 520 may calculate a ratio between the masked first pressure value and the masked second pressure value.

Figure 11:
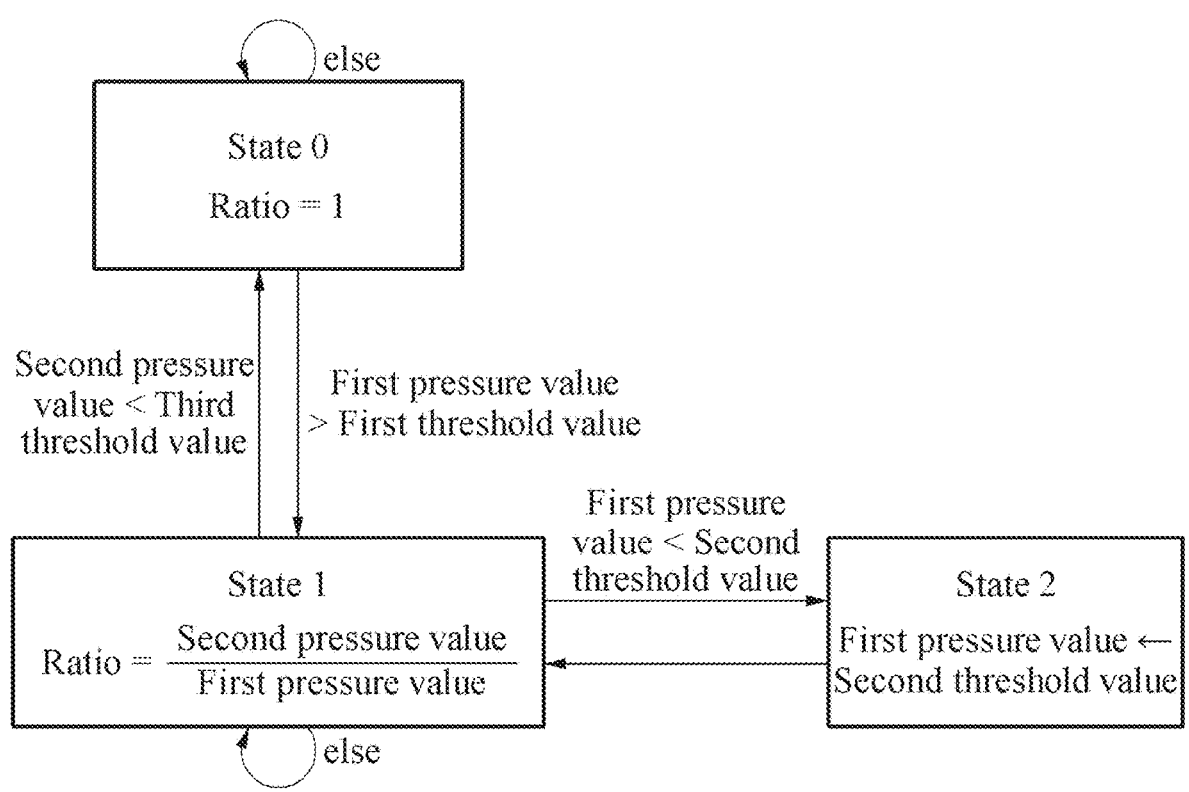
FIG. 11 illustrates an example of masking at least one of a first pressure value and a second pressure value according to at least one example embodiment.

FIG. 11 illustrates an example of masking at least one of a first pressure value and a second pressure value according to at least one example embodiment.

Referring to FIG. 11, a state for masking at least one of a first pressure value and a second pressure value may be determined based on the first pressure value and the second pressure value. A state machine may be used to determine the state.

In some example embodiments, the state may start at a state 0. In the state 0, a ratio may be set to be a default value, for example, "1," irrespective of the first pressure value and the second pressure value. The state 0 may correspond to a swing in a gait mechanism. In the state 0, when the first pressure value exceeds a first threshold value, the state may transition to a state 1. That is, when a heel strike occurs, the state may transition to the state 1.

In the state 1, the processor 520 may determine the ratio between the first pressure value and the second pressure value.

In the state 1, when the first pressure value is less than a second threshold value, the state may transition to a state 2. The first pressure value being less than the second threshold value may indicate an example in which a heel leaves from the ground. Thus, the first pressure value may be affected greatly by noise. To set the first pressure value to be constant, the state may transition to the state 2.

In the state 2, the first pressure value may be set to be identical to the second threshold value. When the first pressure value is set to be identical to the second threshold value, the state may transition immediately to the state 1.

In the state 1, when the second pressure value is less than a third threshold value, the state may transition to the state 0. Since the second pressure value becomes less than the third threshold value at a point in time at which a push-off occurs, that is, at a start of a swing, the state may transition to the state 0.

The state machine will be described further below with reference to FIGS. 12 and 13.

Figure 12:
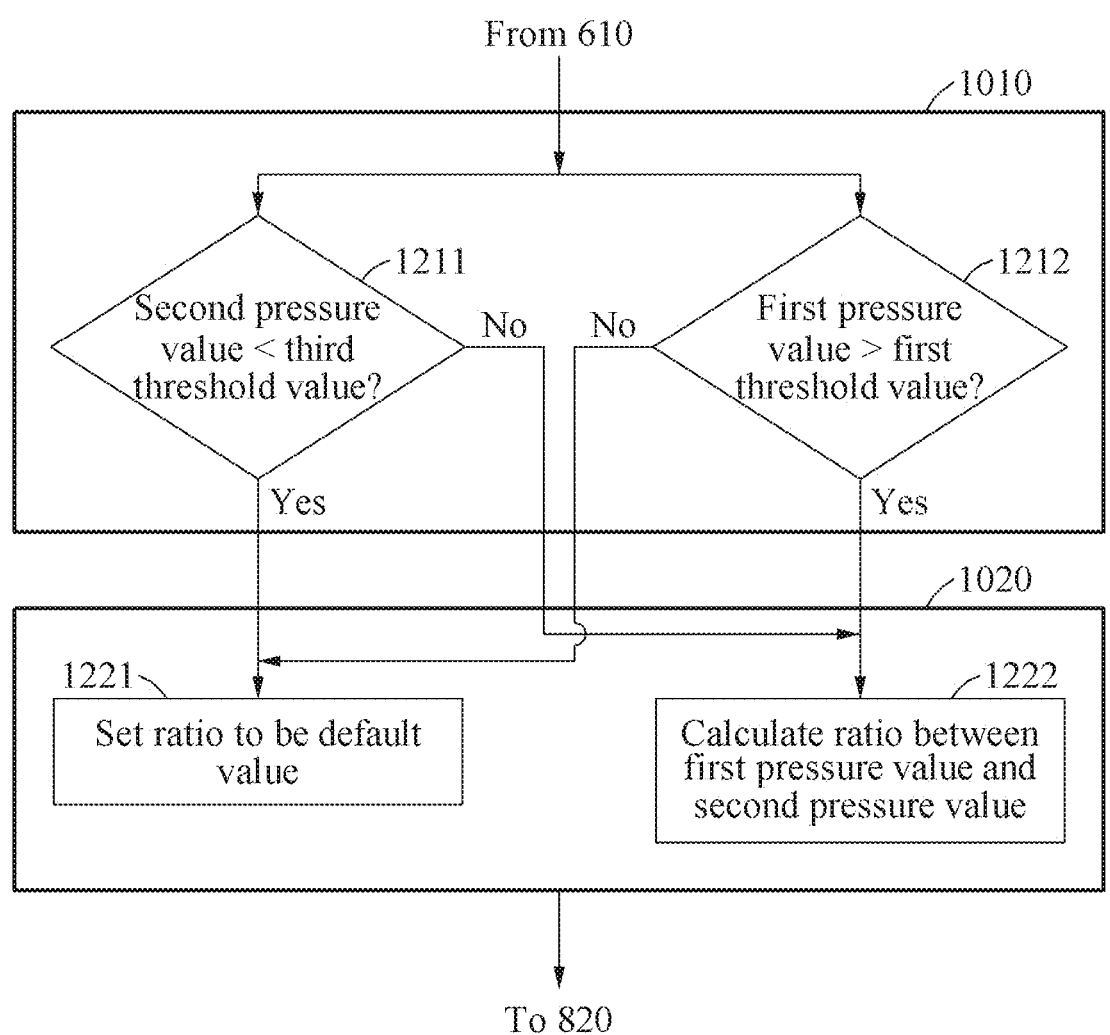
FIG. 12 is a flowchart illustrating an example of calculating a ratio between pressures in a state 0 and a state 1 according to at least one example embodiment.

FIG. 12 is a flowchart illustrating an example of calculating a ratio between pressures in a state 0 and a state 1 according to at least one example embodiment.

Referring to FIG. 12, operation 1010 of FIG. 10 may include operations 1211 and 1212, and operation 1020 of FIG. 10 may include operations 1221 and 1222.

Operation 1211 and operation 1212 may be selectively performed. For example, the processor 520 may perform operation 1211 when a current state is a state 1, and may perform operation 1212 when the current state is a state 0.

In operation 1211, the processor 520 may compare the second pressure value to the third threshold value. When the second pressure value is less than the third threshold value, operation 1221 may be performed. When the second pressure value is less than the third threshold value, the state may transition from the state 1 to the state 0.

In operation 1221, the processor 520 may set the ratio to be the default value. For example, the default value may be "1." Operation 1221 may be an operation of the state 0.

In operation 1212, the processor 520 may compare the first pressure value to the preset first threshold value. When the first pressure value exceeds the first threshold value, operation 1222 may be performed. When the first pressure value exceeds the first threshold value, the state may transition from the state 0 to the state 1.

In operation 1222, the processor 520 may calculate the ratio between the first pressure value and the second pressure value. Operation 1222 may be an operation of the state 1.

Figure 13:
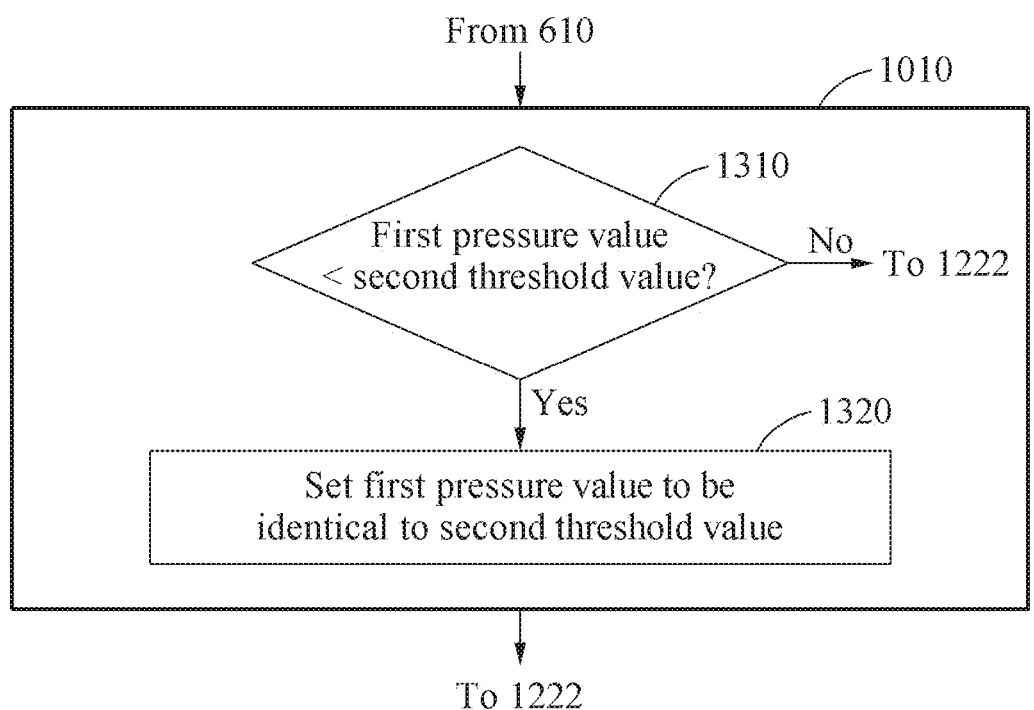
FIG. 13 is a flowchart illustrating an example of calculating a ratio between pressures in a state 1 and a state 2 according to at least one example embodiment.

FIG. 13 is a flowchart illustrating an example of calculating a ratio between pressures in a state 1 and a state 2 according to at least one example embodiment.

Referring to FIG. 13, operation 1010 of FIG. 12 may include operations 1310 and 1320. Operation 1310 may be performed when the current state is the state 1.

In operation 1310, the processor 520 may compare the first pressure value to the preset second threshold value.

When the first pressure value is less than the second threshold value, the state may transition from the state 1 to the state 2. Operation 1320 may be an operation of the state 2.

In operation 1320, the processor 520 may set the first pressure value to be identical to the second threshold value. When the first pressure value is set to be identical to the second threshold value, the state may transition from the state 2 immediately to the state 1.

Figure 14:
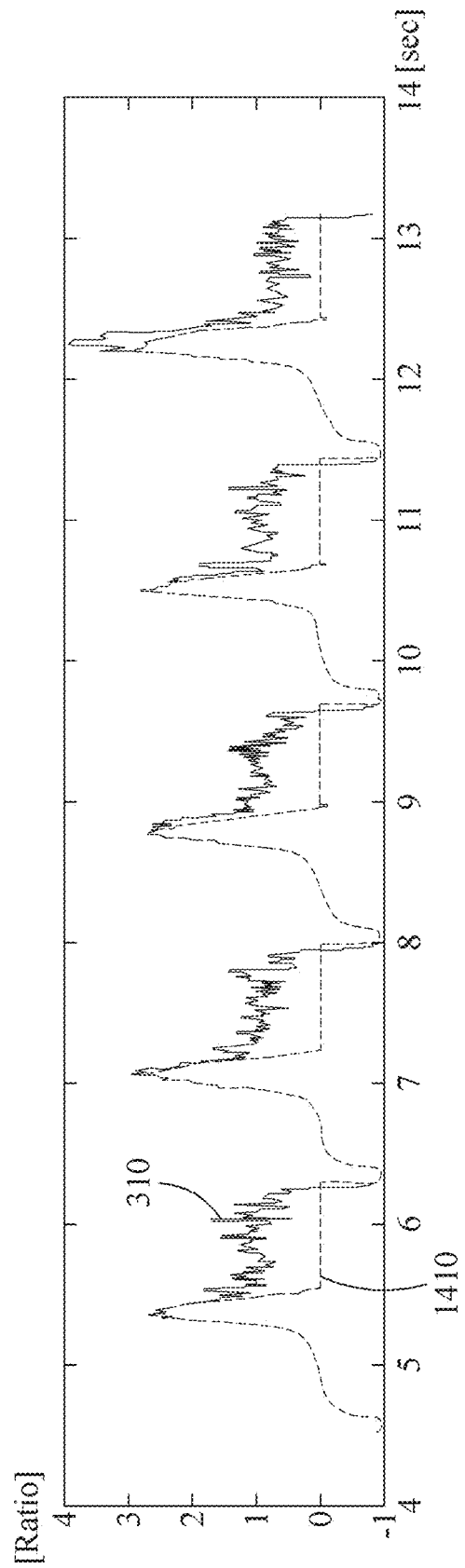
FIG. 14 illustrates a ratio from which noise of a pressure value is not removed and a ratio from which noise of a pressure value is removed according to at least one example embodiment.

FIG. 14 illustrates a ratio from which noise of a pressure value is not removed and a ratio from which noise of a pressure value is removed according to at least one example embodiment.

Referring to FIG. 14, when compared to the ratio trajectory 310 from which noise of a pressure value is not removed, a jitter caused by noise does not appear in a ratio trajectory 1410 from which noise of a pressure value is removed using a state machine.

Since a jitter is not observed in the ratio trajectory 1410, a jitter may not appear in an assistance torque trajectory generated based on the ratio trajectory 1410. Since a jitter does not appear in the assistance torque trajectory generated based on the ratio trajectory 1410, a user may not feel inconvenience from frequent adjustment of torque values.

Figure 15:
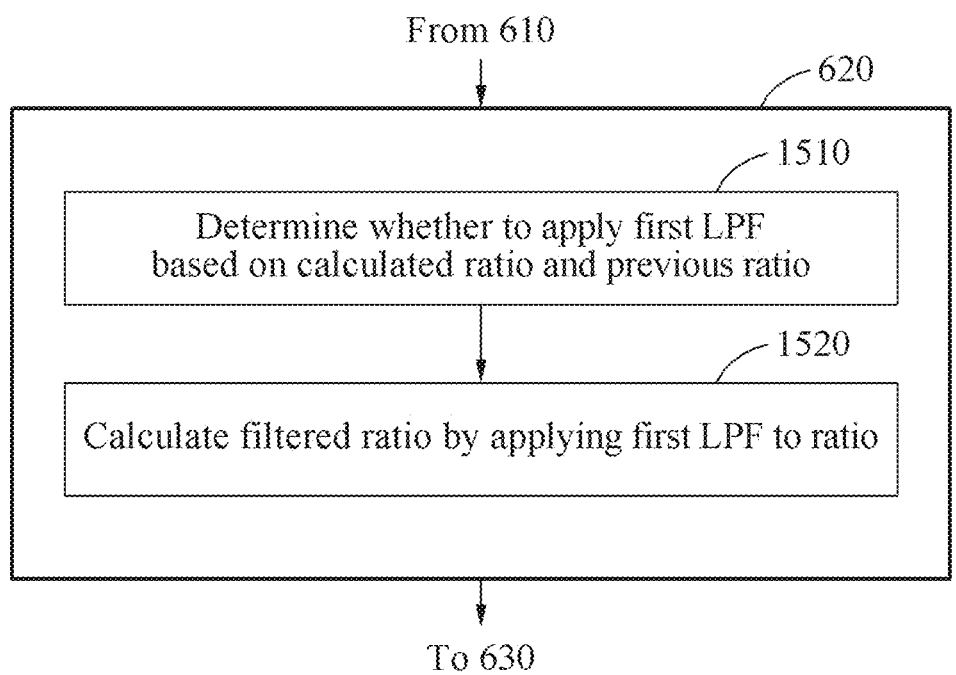
FIG. 15 is a flowchart illustrating an example of calculating a filtered ratio using a first low-pass filter (LPF) according to at least one example embodiment.

FIG. 15 is a flowchart illustrating an example of calculating a filtered ratio using a first low-pass filter (LPF) according to at least one example embodiment.

Referring to FIG. 15, operation 620 of FIG. 6 may include operations 1510 and 1520.

In operation 1510, the processor 520 may determine whether to apply a first LPF based on the calculated ratio and a previous ratio. The previous ratio may be a ratio calculated in a previous operation. When a difference between the calculated ratio and the previous ratio is great, the first LPF may be applied to the ratio to inhibit (or, alternatively, prevent) a drastic change. For example, whether the difference between the calculated ratio and the previous ratio exceeds a threshold value may be determined.

In operation 1520, the processor 520 may calculate a filtered ratio by applying the first LPF to the ratio. For example, the first LPF may be a filter that smooths a ratio trajectory.

Figure 16:
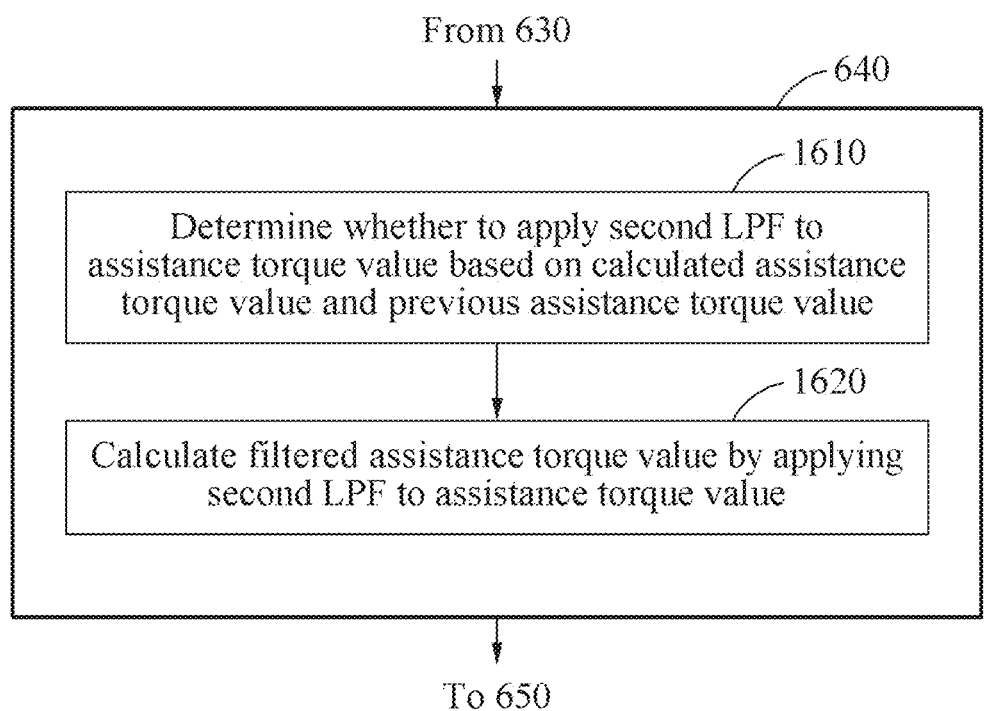
FIG. 16 is a flowchart illustrating an example of calculating a filtered assistance torque value using a second LPF according to at least one example embodiment.

FIG. 16 is a flowchart illustrating an example of calculating a filtered assistance torque value using a second LPF according to at least one example embodiment.

Referring to FIG. 16, operation 640 of FIG. 6 may include operations 1610 and 1620.

In operation 1610, the processor 520 may determine whether to apply a second LPF based on the calculated assistance torque value and a previous assistance torque value. The previous assistance torque value may be an assistance torque value calculated in a previous operation. When a difference between the calculated assistance torque value and the previous assistance torque value is great, the second LPF may be applied to the assistance torque value to inhibit (or, alternatively, prevent) a drastic change. For example, whether the difference between the calculated assistance torque value and the previous assistance torque value exceeds a threshold value may be determined.

In operation 1620, the processor 520 may calculate a filtered assistance torque value by applying the second LPF to the assistance torque value. For example, the second LPF may be a filter that smooths a trajectory of an assistance torque value.

Figure 17:
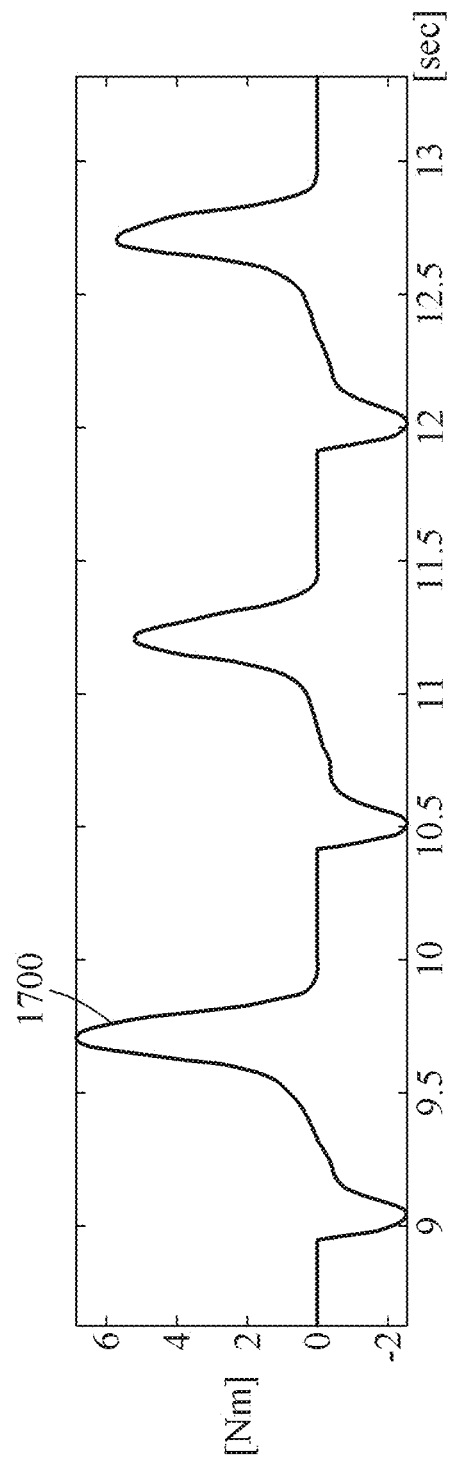
FIG. 17 illustrates a trajectory of a calculated assistance torque value according to at least one example embodiment.

FIG. 17 illustrates a trajectory of a calculated assistance torque value according to at least one example embodiment.

Referring to FIG. 17, a jitter may not appear in a trajectory 1700 of the assistance torque value calculated based on the ratio calculated based on the ratio between the masked first pressure value and the second pressure value. At a point in time of a maximum value of the trajectory 1700 of the assistance torque value, a push-off may occur. A section in which the assistance torque value is maintained within a preset range (for example, including "0") may correspond to a swing state. At a point in time at which the assistance torque value becomes a negative number, a heel strike may occur. To alleviate an impact caused by the heel strike and assist a motion after the heel strike, an assistance torque to flex an ankle may be output.

Figure 18:
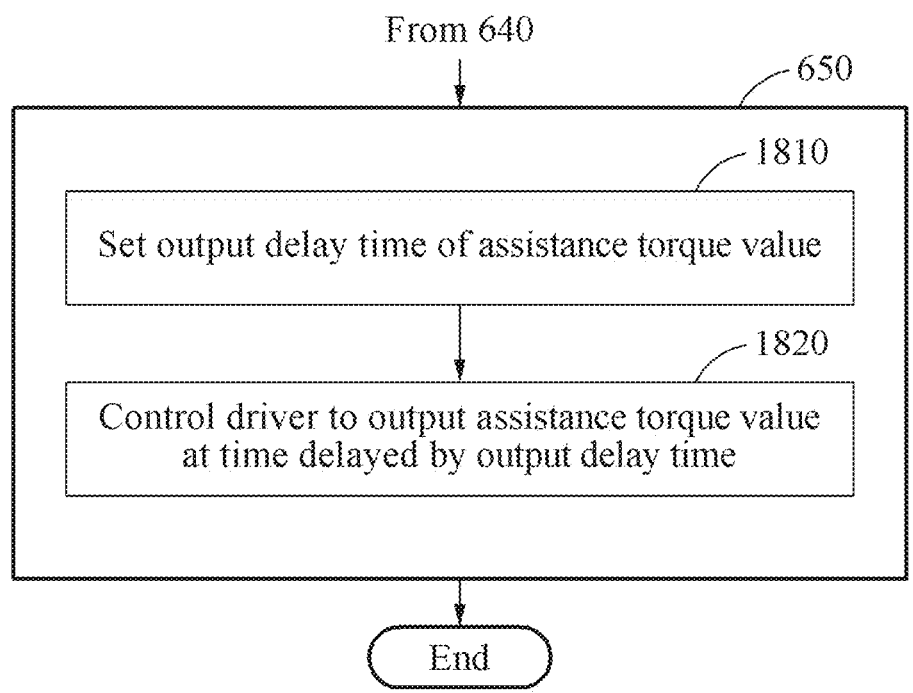
FIG. 18 is a flowchart illustrating an example of controlling a driver to output a delayed assistance torque value according to at least one example embodiment.

FIG. 18 is a flowchart illustrating an example of controlling a driver to output a delayed assistance torque value according to at least one example embodiment.

Referring to FIG. 18, operation 650 of FIG. 6 may include operations 1810 and 1820.

In operation 1810, the processor 520 may set an output delay time of the assistance torque value. For example, when the user feels more comfortable if the assistance torque is output at a delayed time, the user may set a delay time such that the assistance torque may be output at the delayed time.

In operation 1820, the processor 520 may control the driver 540 to output the assistance torque value at a time delayed by the output delay time.

Figure 19:
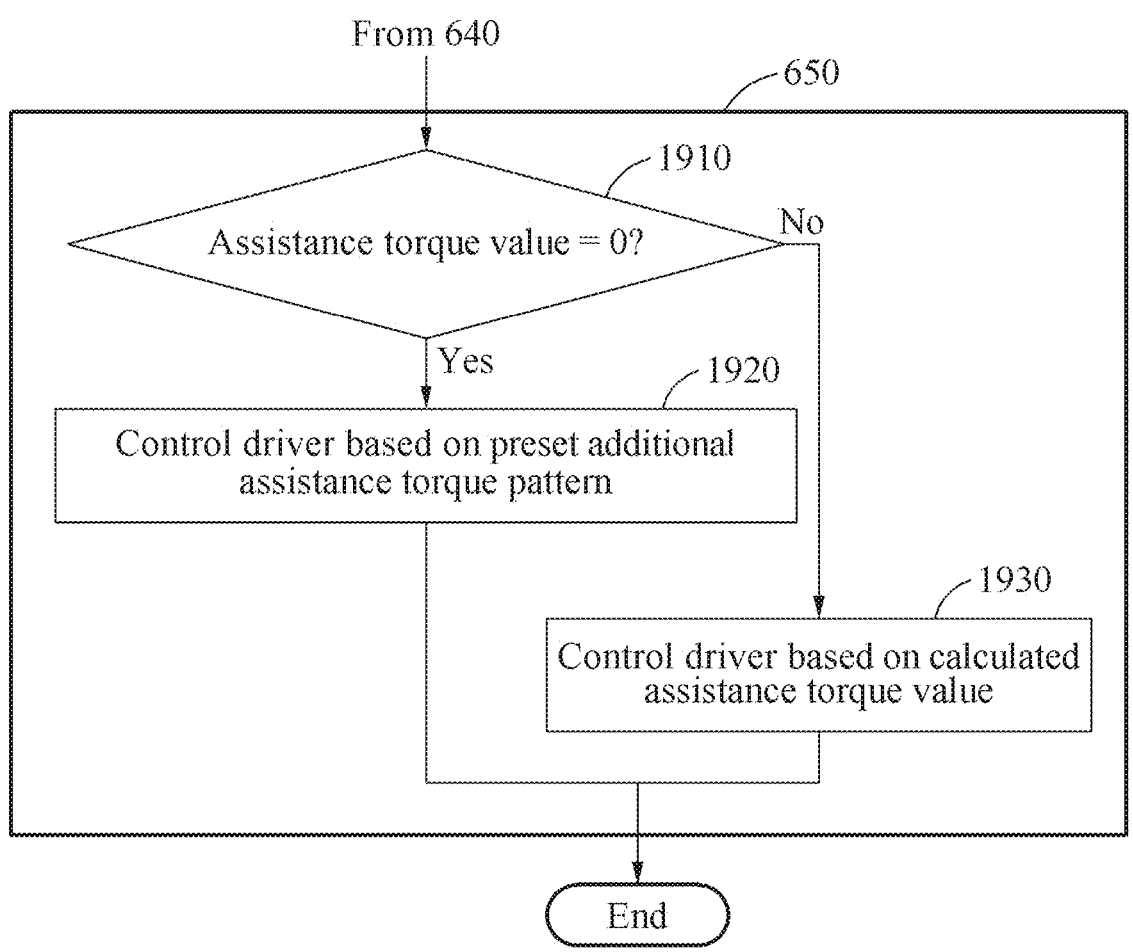
FIG. 19 is a flowchart illustrating an example of controlling a driver to output an additional assistance torque value according to at least one example embodiment.

FIG. 19 is a flowchart illustrating an example of controlling a driver to output an additional assistance torque value according to at least one example embodiment.

Referring to FIG. 19, operation 650 of FIG. 6 may include operations 1910, 1920, and 1930.

In operation 1910, the processor 520 may determine whether the assistance torque value is maintained within a desired (or, alternatively, a preset) range (for example, including "0") during a preset time. The assistance torque value maintained to be "0" may indicate that the driver 540 does not operate.

When the assistance torque value is maintained within a preset range, the processor 520 may control the driver 540 based on a preset additional assistance torque pattern, in operation 1920. Since the assistance torque value maintain the preset range, the driver 540 may be controlled based on the additional assistance torque pattern. The additional assistance torque pattern may be trajectories of additional assistance torque values output during the preset time.

For example, the additional assistance torque pattern may be a pattern of the additional assistance torque value to inhibit (or, alternatively, prevent) a foot drop of the user in a swing state. The additional assistance torque pattern may be a pattern for a dorsi-flexion after a push-off. The driver 540 may be controlled to flex and then extend the ankle of the user of the walking assistance apparatus 500 based on the additional assistance torque pattern.

When the assistance torque value is not maintained the preset range, the processor 520 may control the driver 540 based on the calculated assistance torque value, in operation 1930.

Figure 20:
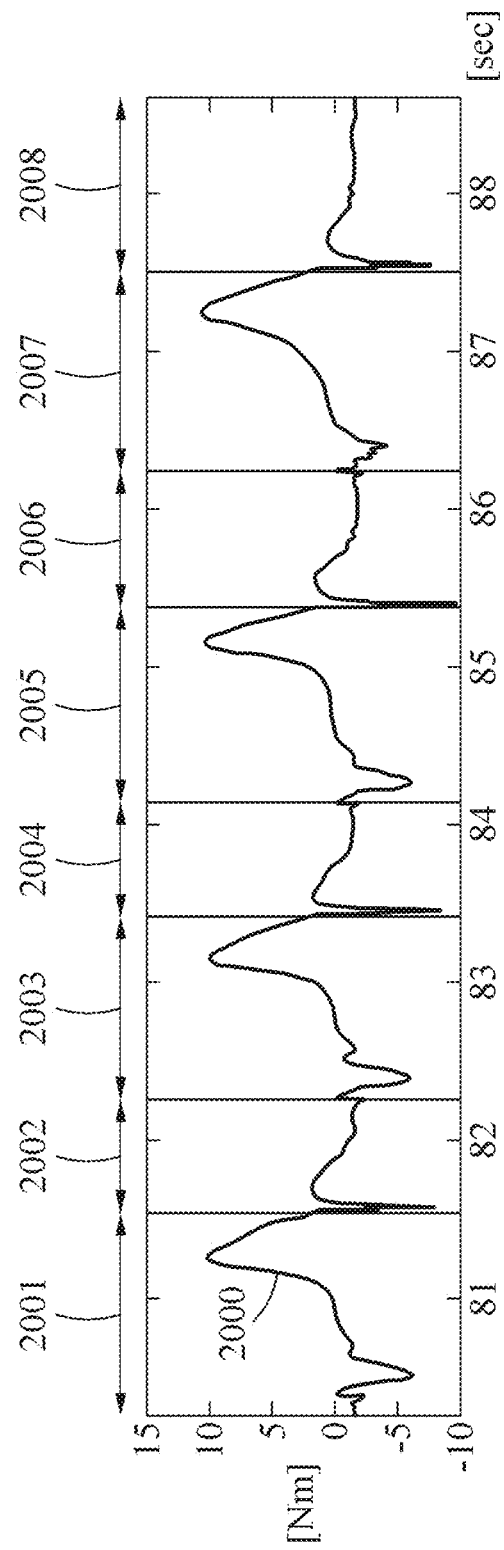
FIG. 20 illustrates a trajectory of a final assistance torque value to which an additional assistance torque pattern is added according to at least one example embodiment.

FIG. 20 illustrates a trajectory of a final assistance torque value to which an additional assistance torque pattern is added according to at least one example embodiment.

In a trajectory 2000 of a final assistance torque value, a trajectory of a general region 2001, 2003, 2005, 2007 may correspond to an assistance torque value calculated based on a ratio of pressure values, and a trajectory of an additional region 2002, 2004, 2006, 2008 may correspond to an additional assistance torque value calculated based on an additional assistance torque pattern.

Figure 21:
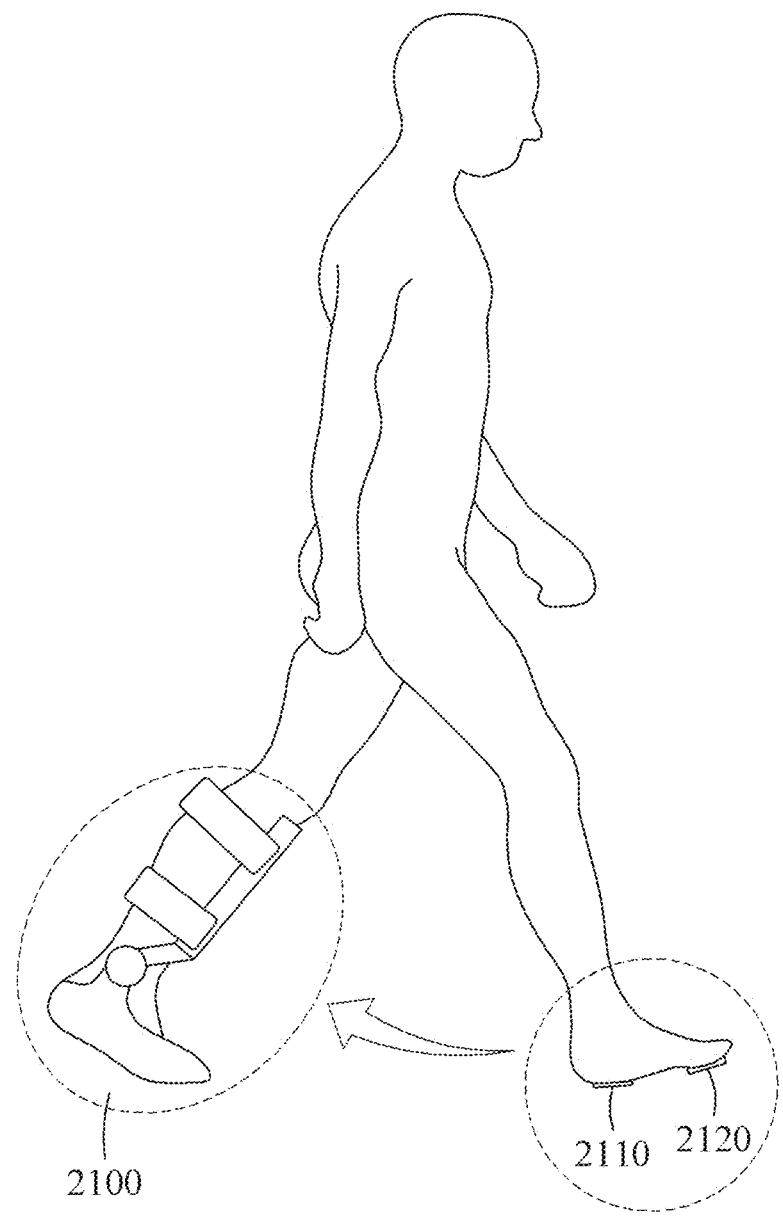
FIG. 21 illustrates an ankle-type walking assistance apparatus according to at least one example embodiment.

FIG. 21 illustrates an ankle-type walking assistance apparatus according to at least one example embodiment.

The walking assistance apparatus 500 described above with reference to FIGS. 5 through 20 relates to an example of sensing pressure values of a sole of a foot of a first leg, and providing an assistance torque calculated based on the sensed pressure values to the first leg.

Unlike the walking assistance apparatus 500, a walking assistance apparatus 2100 relates to an example of sensing pressure values of a sole of a foot of a first leg, and providing an assistance torque calculated based on the sensed pressure values to a second leg. The walking assistance apparatus 2100 may be used by a user having a problem with one leg.

The walking assistance apparatus 2100 may receive a first pressure value and a second pressure value from a first pressure sensor 2110 and a second pressure sensor 2120 which are physically separate and disposed on a sole of a foot of a first leg of a user. For example, the first pressure value and the second pressure value may be transmitted through wireless communication.

The walking assistance apparatus 2100 may calculate an assistance torque value based on the first pressure value and the second pressure value. The calculated assistance torque value is associated with the first leg. However, in normal walking, the first leg and a second leg move symmetrically with a time difference. Thus, when a point in time at which the assistance torque value is to be output is adjusted through operations 1810 and 1820 of FIG. 18, the assistance torque value for which the output point in time is adjusted may be used for the second leg. That is, the walking assistance apparatus 2100 may control a driver disposed on the second leg of the user.

A hip-type walking assistance apparatus 2200 that may be additionally combined with the walking assistance apparatus 500 described with reference to FIGS. 5 through 20 will be described below with reference to FIGS. 22 and 23. The hip-type walking assistance apparatus 2200 may be an apparatus for providing a walking assistance torque to a hip joint of a user. The walking assistance apparatus 500 may be connected to the hip-type walking assistance apparatus 2200 through wired communication or wireless communication. The hip-type walking assistance apparatus 2200 may provide the user with an assistance torque corresponding to a gait phase determined with respect to a motion of the user. For example, the walking assistance apparatus 500 may provide the assistance torque to a talocrural joint of the user, and the hip-type walking assistance apparatus 2200 may provide an assistance torque to the hip joint of the user.

<Overview of Hip-Type Walking Assistance Apparatus>

Figure 22:
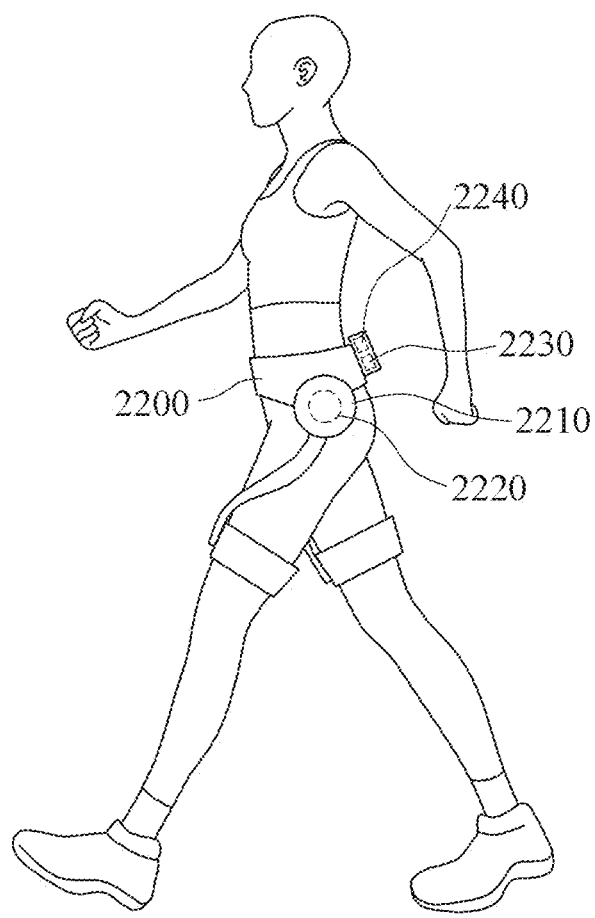
FIGS. 22 and 23 illustrate a hip-type walking assistance apparatus according to at least one example embodiment.
Figure 23:
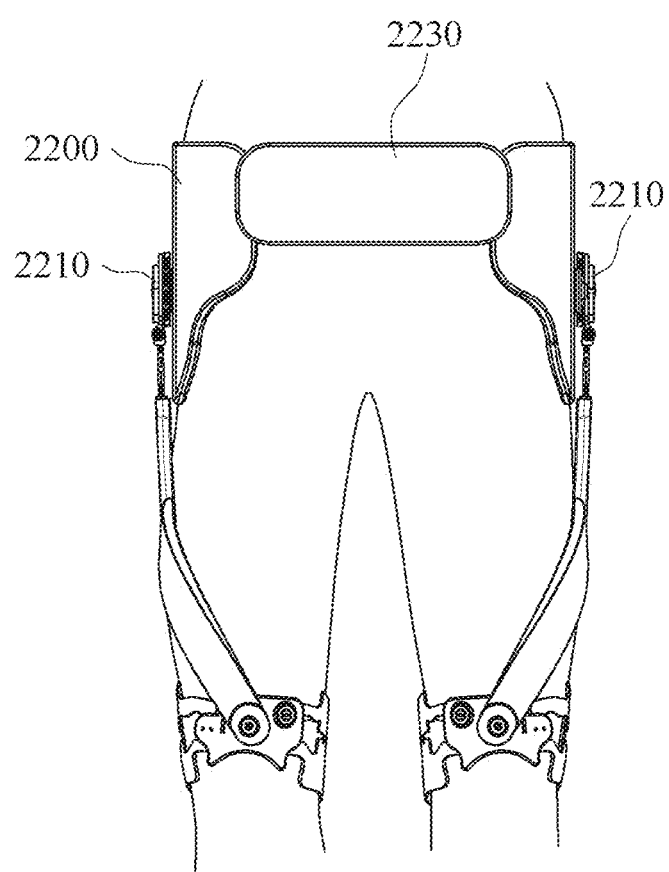

FIGS. 22 and 23 illustrate a hip-type walking assistance apparatus according to at least one example embodiment.

Referring to FIG. 22, a hip-type walking assistance apparatus 2200 may be worn by a user to assist walking of a user. The walking assistance apparatus 2200 may be a wearable device.

The examples of FIGS. 22 and 23 may be applicable to a hip-type walking assistance apparatus, but are not limited thereto. The present examples may be applicable to any type of apparatuses that assist walking of the user.

Referring to FIGS. 22 and 23, the hip-type walking assistance apparatus 2200 may include a driver 2210, a sensor 2220, an inertial measurement unit (IMU) 2230, and a controller 2240.

The driver 2210 may provide a driving force to a hip joint of the user. For example, the driver 2210 may be provided to a right hip portion and/or a left hip portion of the user. The driver 2210 may include a motor capable of generating a rotational torque.

The sensor 2220 may measure an angle of the hip joint of the user during walking. Information associated with the angle of the hip joint of the user sensed at the sensor 2220 may include an angle of a right hip joint, an angle of a left hip joint, a difference between the angle of the right hip joint and the angle of the left hip joint, and a hip joint motion direction. For example, the sensor 2220 may be disposed in the driver 2210.

The sensor 2220 may include a potentiometer. The potentiometer may sense a right (R) axis joint angle, a left (L) axis joint angle, an R axis joint acceleration, and an L axis joint acceleration according to a gait motion of the user.

The IMU 2230 may measure acceleration and posture information during walking. For example, the IMU 2230 may sense each of X axis, Y axis, and Z axis accelerations, and X axis, Y axis, and Z axis angular velocities according to a gait motion of the user.

The hip-type walking assistance apparatus 2200 may detect a point at which a foot of the user lands based on the acceleration information measured by the IMU 2230.

In addition to the sensor 2220 and the IMU 2230, the hip-type walking assistance apparatus 2200 may include other sensors, for example, an electromyogram (EMG) sensor and an electroencephalogram (EEG) sensor, capable of sensing a change in biosignals or momentum of the user according to the gait motion of the user.

The controller 2240 may control the driver 2210 to output an assistance torque to assist walking of the user. For example, the hip-type walking assistance apparatus 2200 may include two drivers 2210 on a left hip and a right hip of the user, respectively, and the controller 2240 may output control signals for controlling the two drivers 1610 to generate a torque. The controller 2240 may include a communicator, a processor, and a memory.

The driver 2210 may generate a torque in response to the control signal output from the controller 2240. The hip-type walking assistance apparatus 2200 may include the driver 2210 for a right leg of the user and the driver 2210 for a left leg of the user. For example, the controller 2240 may be designed to control one of the drivers 2210. If the controller 2240 controls only a single driver 2210, a number of controllers 2240 may be provided. As another example, the controller 2240 may be designed to control all of the drivers 2210 for the left leg and the right leg of the user.

Unlike the hip-type walking assistance apparatus 2200 of FIGS. 22 and 23, the walking assistance apparatus 500 may be included in a full body-type the walking assistance apparatus 400 which will be described with reference to FIGS. 24 through 26. The full body-type the walking assistance apparatus 400 may be an apparatus for providing walking assistance torques to a hip joint, a knee joint, and a talocrural joint of a user.

<Overview of Full Body-Type Walking Assistance Apparatus>

Figure 24:
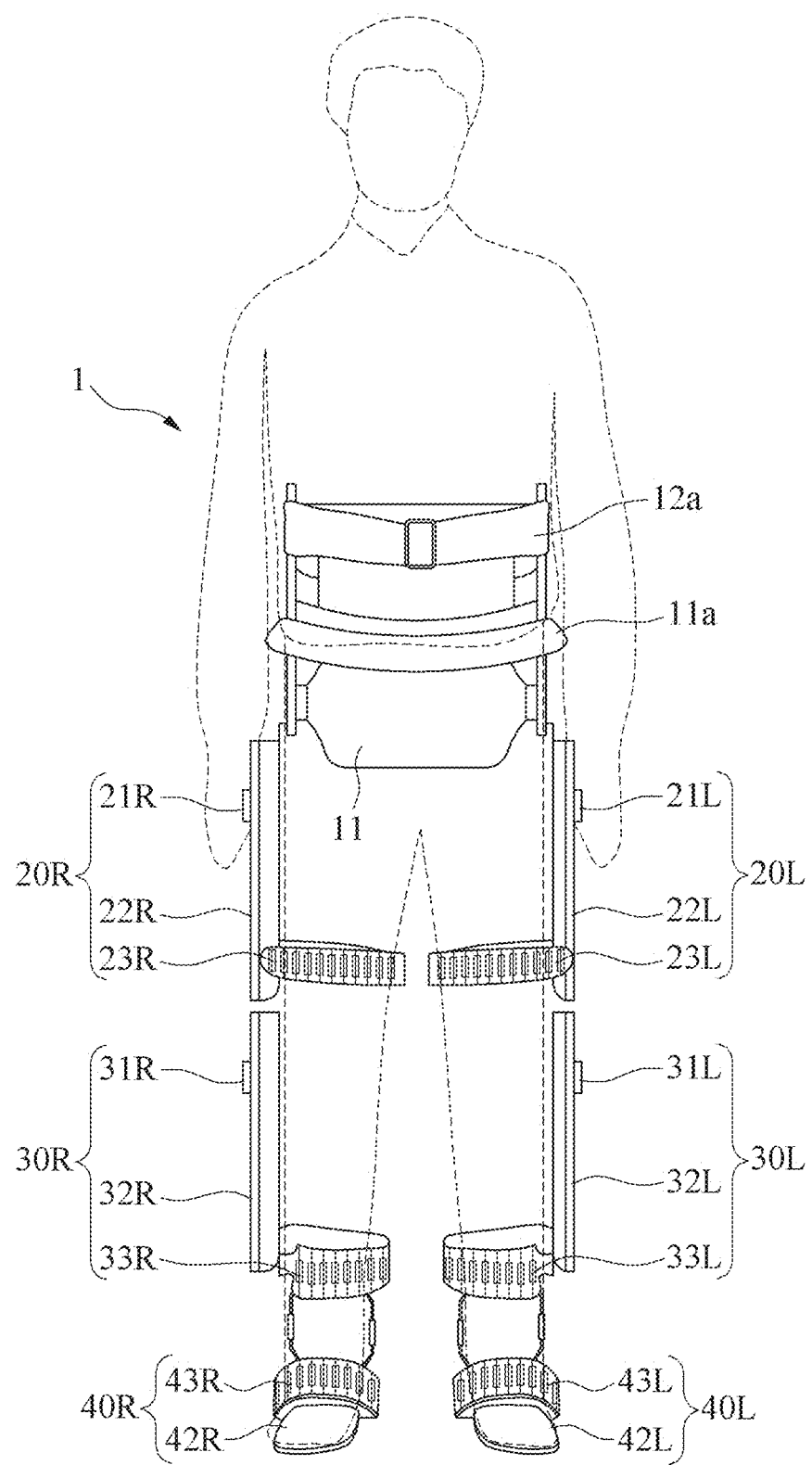
FIGS. 24 through 26 illustrate a full body-type walking assistance apparatus according to at least one example embodiment.
Figure 25:
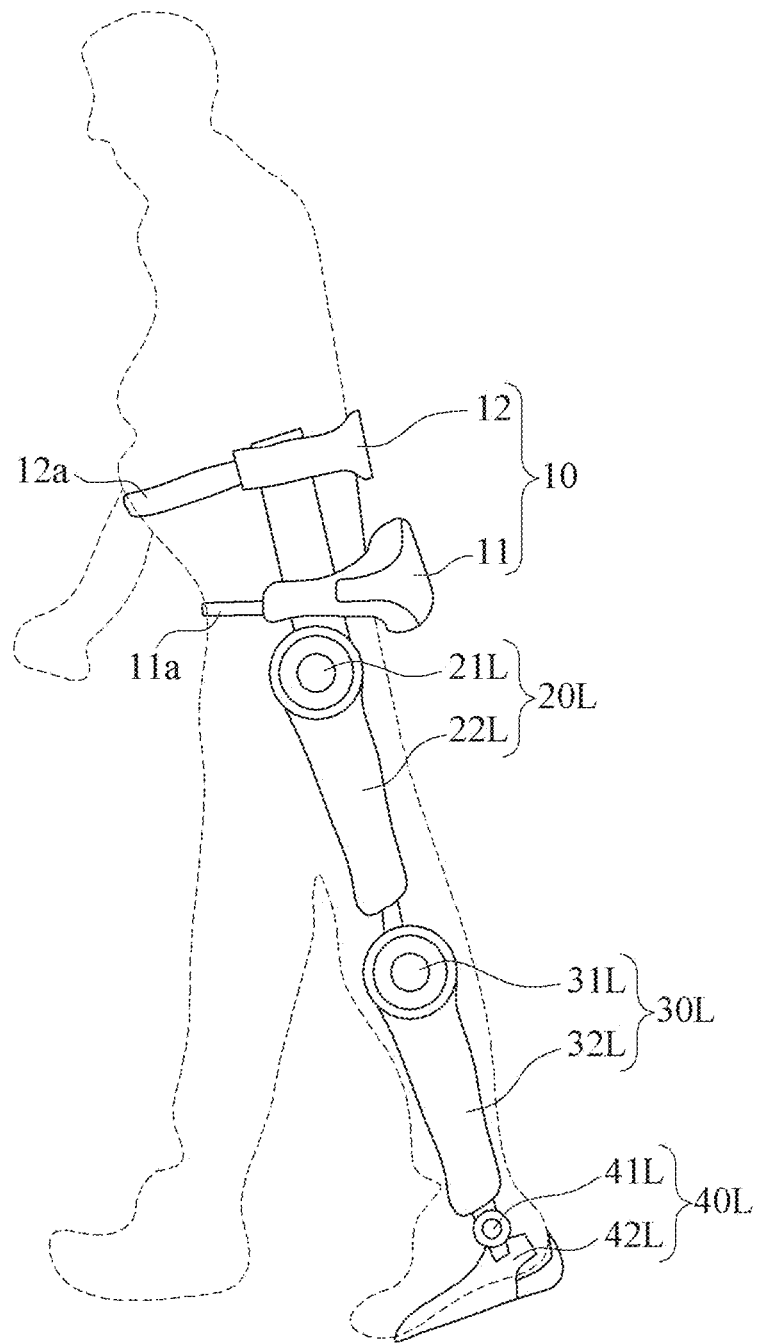
Figure 26:
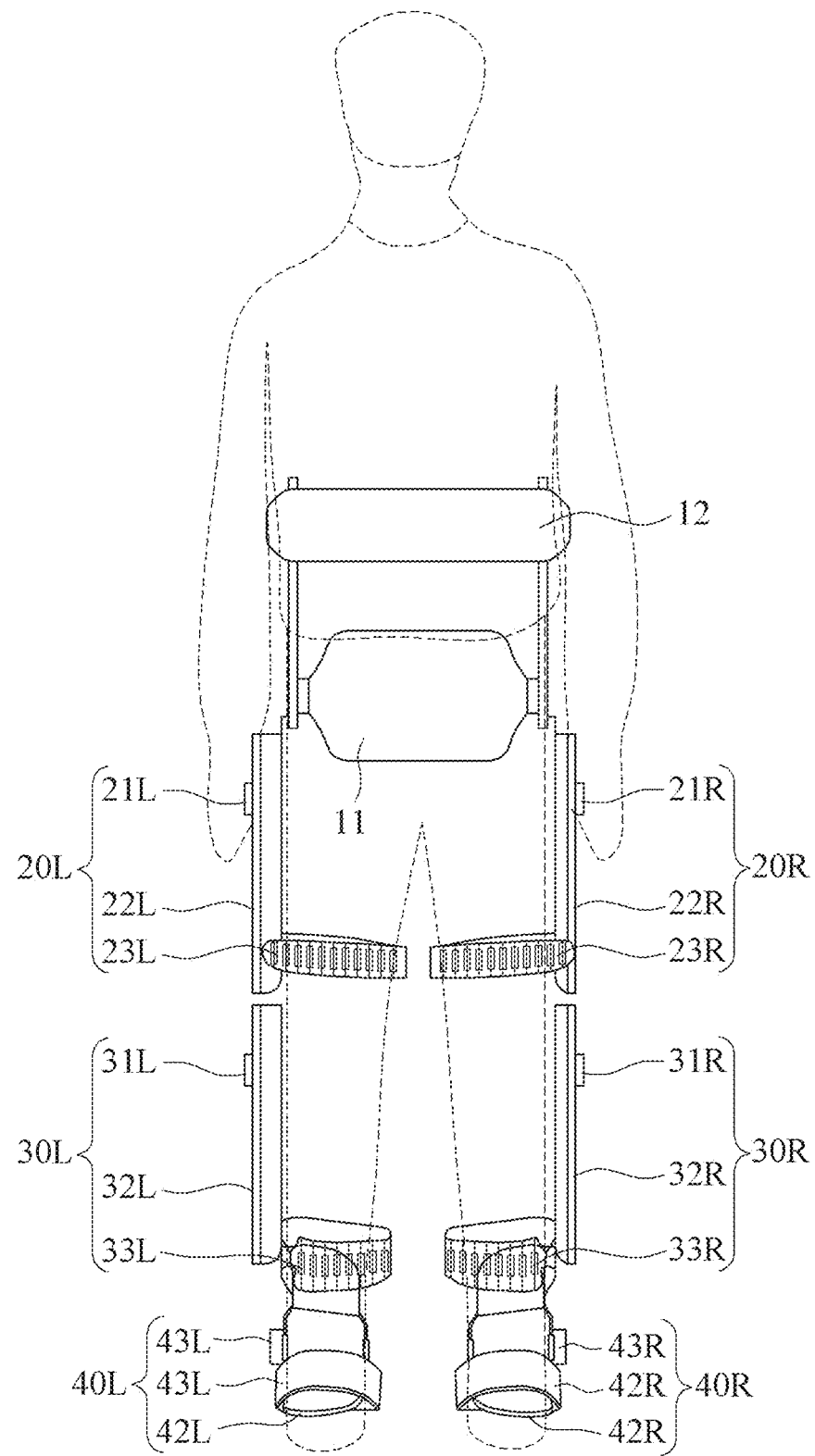

FIGS. 24 through 26 illustrate the full body-type walking assistance apparatus 1 according to at least one example embodiment. FIG. 24 is a front view of the full body-type walking assistance apparatus 1, FIG. 25 is a side view of the full body-type walking assistance apparatus 1, and FIG. 26 is a rear view of the full body-type walking assistance apparatus 1.

According to an aspect, the full body-type walking assistance apparatus 1 may include the driver 2210, the sensor 2220, the IMU 2230, and the controller 2240.

As shown in FIGS. 24 through 26, the full body-type walking assistance apparatus 1 may be in an exoskeleton structure to be wearable to each of a left leg and a right leg of a user. The user may perform a motion, for example, an extension motion, a flexion motion, an adduction motion, and an abduction motion, with wearing the full body-type walking assistance apparatus 1. The extension motion is a movement that extends a joint, and the flexion motion is a movement that flexes a joint. The adduction motion is a movement that moves a leg to be close to a central axis of the body, and the abduction motion is a movement that extends a leg to be away from the central axis of the body.

Referring to FIGS. 24 through 26, the full body-type walking assistance apparatus 1 may include a main body 10, and mechanisms 20, 30, and 40.

The main body 10 may include a housing 11. Various components may be provided in the housing 11. The components provided in the housing 11 may include, for example, a CPU, a printed circuit board (PCB), various types of storage devices, and a power source. The main body 10 may include the controller 2240 described above. The controller 2240 may include a CPU and a PCB.

The CPU may be a microprocessor. The microprocessor may include an arithmetic logical operator, a register, a program counter, a command decoder, and/or a control circuit on a silicon chip. The CPU may select a control mode suitable for a gait environment and generate a control signal to control operations of the mechanisms 20, 30, and 40 based on the selected control mode.

The PCB may be a board on which a predetermined circuit is printed. A CPU and/or various storage devices may be provided on the PCB. The PCB may be fixed to an inner side surface of the housing 11.

Various types of storage devices may be provided in the housing 11. The storage devices may be magnetic disk storage devices to store data by magnetizing a surface of a magnetic disk, and semiconductor memory devices to store data using various types of memory semiconductors.

The power source provided in the housing 11 may supply a driving power to the various components provided in the housing 11, or the mechanisms 20, 30, and 40.

The main body 10 may further include a waist support 12 to support a waist of the user. The waist support 12 may have a shape of a curved plane so as to support the waist of the user.

The main body 10 may further include a fixer 11a to fix the housing 11 to a hip of the user, and a fixer 12a to fix the waist support 12 to the waist of the user. The fixer 11a, 12a may be implemented by one of a band, a belt, and a strap having elasticity.

The main body 10 may include the IMU 2230 described above. For example, the IMU 2230 may be provided outside or inside the housing 11. The IMU 2230 may be provided on the PCB in the housing 11. The IMU 2230 may measure accelerations and angular velocities.

The mechanisms 20, 30, and 40 may include a first structure 20R, 20L, a second structure 30R, 30L, and a third structure 40R, 40L, respectively, as shown in FIGS. 24 through 26.

The first structure 20R, 20L may assist motions of a thigh and a hip joint of the user during a gait motion. The first structure 20R, 20L may include a first driver 21R, 21L, a first support 22R, 22L, and a first fixer 23R, 23L.

The driver 2210 described above may include the first driver 21R, 21L, and the description of the driver 2210 provided with reference to FIGS. 22 and 23 may be substituted with the description of the first driver 21R, 21L.

The first driver 21R, 21L may be positioned on a hip joint portion of the first structure 20R, 20L and generate a rotational force in various magnitudes in a predetermined direction. A torque generated by the first driver 21R, 21L may be applied to the first support 22R, 22L. The first driver 21R, 21L may be set to rotate within a range of motion of a hip joint of a human body.

The first driver 21R, 21L may operate based on the control signal provided by the main body 10. The first driver 21R, 21L may be implemented by one of a motor, a vacuum pump, and a hydraulic pump. However, example embodiments are not limited thereto.

A joint angle sensor may be provided in a vicinity of the first driver 21R, 21L. The joint angle sensor may detect an angle at which the first driver 21R, 21L rotates about a rotation axis. The sensor 2220 described above may include the joint angle sensor.

The first support 22R, 22L may be physically connected to the first driver 21R, 21L. The first support 22R, 22L may rotate in a predetermined direction with the rotational force generated by the first driver 21R, 21L.

The first support 22R, 22L may be implemented in various shapes. For example, the first support 22R, 22L may be implemented in a shape of a plurality of segments being connected to each other. In this example, a joint may be provided between the segments, and the first support 22R, 22L may be bent by the joint within a predetermined range. In another example, the first support 22R, 22L may be implemented in a shape of a rod. In this example, the first support 22R, 22L may be implemented by a flexible material so as to be bent within a predetermined range.

The first fixer 23R, 23L may be provided on the first support 22R, 22L. The first fixer 23R, 23L may fix the first support 22R, 22L to the thigh of the user.

FIGS. 24 through 26 illustrate an example in which the first support 22R, 22L is fixed to an outer side of the thigh of the user by the first fixer 23R, 23L. When the first support 22R, 22L rotates as the first driver 21R, 21L operates, the thigh to which the first support 22R, 22L is fixed may also rotate in a direction the same as a direction in which the first support 22R, 22L rotates.

The first fixer 23R, 23L may be implemented by one of a band, a belt, and a strap having elasticity, or implemented by a metallic material. FIG. 24 illustrates the first fixer 23R, 23L implemented by a chain.

The second structure 30R, 30L may assist motions of a lower leg and a knee joint of the user during a gait motion. The second structure 30R, 30L may include a second driver 31R, 31L, a second support 32R, 32L, and a second fixer 33R, 33L.

The second driver 31R, 31L may be positioned on a knee joint portion of the second structure 30R, 30L and generate a rotational force in various magnitudes in a predetermined direction. The rotational force generated by the second driver 31R, 31L may be applied to the second support 32R, 32L. The second driver 31R, 31L may be set to rotate within a range of motion of a knee joint of a human body.

The driver 2210 described above may include the second driver 31R, 31L. The description of the hip joint provided with reference to FIGS. 22 and 23 may similarly apply to the description related to the knee joint.

The second driver 31R, 31L may operate based on the control signal provided by the main body 10. The second driver 31R, 31L may be implemented by one of a motor, a vacuum pump, and a hydraulic pump. However, example embodiments are not limited thereto.

A joint angle sensor may be provided in a vicinity of the second driver 31R, 31L. The joint angle sensor may detect an angle at which the second driver 31R, 31L rotates about a rotation axis. The sensor 2220 described above may include the joint angle sensor.

The second support 32R, 32L may be physically connected to the second driver 31R, 31L. The second support 32R, 32L may rotate in a predetermined direction with the rotational force generated by the second driver 31R, 31L.

The second fixer 33R, 33L may be provided on the second support 32R, 32L. The second fixer 33R, 33L may fix the second support 32R, 32L to the lower leg of the user. FIGS. 24 through 26 illustrate an example in which the second support 32R, 32L is fixed to an outer side of the lower leg of the user by the second fixer 33R, 33L. When the second support 32R, 32L rotates as the second driver 31R, 31L operates, the lower leg to which the second support 32R, 32L is fixed may also rotate in a direction the same as a direction in which the second support 32R, 32L rotates.

The second fixer 33R, 33L may be implemented by one of a band, a belt, and a strap having elasticity, or implemented by a metallic material.

The third structure 40R, 40L may assist motions of an ankle joint and relevant muscles of the user during a gait motion. The third structure 40R, 40L may include a third driver 41R, 41L, a foot rest 42R, 42L, and a third fixer 43R, 43L.

The driver 2210 described above may include the third driver 41R, 41L. The description of the hip joint provided with reference to FIGS. 22 and 23 may similarly apply to the description related to the ankle joint.

The third driver 41R, 41L may be provided on an ankle joint portion of the third structure 40R, 40L and operate based on the control signal provided by the main body 10. The third driver 41R, 41L may also be implemented by a motor, similar to the first driver 21R, 21L or the second driver 31R, 31L.

The foot rest 42R, 42L may be provided at a position corresponding to a sole of the user and physically connected to the third driver 41R, 41L.

A pressure sensor may be provided on the foot rest 42R, 42L to sense a weight of the user. A sensing result of the pressure sensor may be used to determine whether the user is wearing the walking assistance apparatus 1, whether the user is standing, or whether a foot of the user contacts the ground. Further, the sensing result of the pressure sensor may be additionally used to calculate an assistance torque value to be provided to an ankle of the user.

The pressure sensor provided on the foot rest 42R, 42L may correspond to the pressure sensor 550, 560 of FIG. 5.

The third fixer 43R, 43L may be provided on the foot rest 42R, 42L. The third fixer 43R, 43L may fix the foot of the user to the foot rest 42R, 42L.

In an example, the third structure 40R, 40L may correspond to the walking assistance apparatus 500 of FIG. 5. For example, the driver 540 of FIG. 5 may correspond to the third driver 41R, 41L.

The method according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments.

For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling a driver of a walking assistance apparatus, the method comprising:
   receiving a first pressure value and a second pressure value from a first pressure sensor and a second pressure sensor, respectively;
   calculating a ratio between the first pressure value and the second pressure value;
   determining a preset gain value based on the ratio;
   determining a gain adjusted ratio as a product of the gain value and the ratio between the first pressure value and the second pressure value;
   setting an assistance torque value as the gain adjusted ratio; and
   controlling the driver of the walking assistance apparatus to output the assistance torque value.

2. The method of claim 1, wherein
   the first pressure sensor is associated with a first area of the walking assistance apparatus corresponding to a heel of a foot of a user, and
   the second pressure sensor is associated with a second area of the walking assistance apparatus corresponding to a ball of the foot of the user.

3. The method of claim 1, wherein the calculating the ratio comprises:
   calculating an initial ratio between the first pressure value and the second pressure value; and
   calculating a final ratio based on a value and the initial ratio.

4. The method of claim 1, wherein the calculating the ratio comprises:
   masking the first pressure value and the second pressure value to generate masked pressure values; and
   calculating a ratio between the masked pressure values.

5. The method of claim 4, wherein
   the masking includes comparing the second pressure value to a first threshold value, and
   the calculating the ratio between the masked pressure values includes setting the ratio as a default value in response to the second pressure value being less than the first threshold value.

6. The method of claim 5, wherein
   the masking further includes comparing the first pressure value to a second threshold value, and
   the calculating of the ratio between the masked pressure values further includes calculating the ratio between the first pressure value and the second pressure value in response to the first pressure value exceeding the second threshold value.

7. The method of claim 4, wherein the masking comprises:
   comparing the first pressure value to a first threshold value; and
   setting the first pressure value to be same as the first threshold value in response to the first pressure value being less than the first threshold value.

8. The method of claim 1, wherein the calculating the ratio between the first pressure value and the second pressure value comprises:
   determining whether to apply a first low-pass filter (LPF) to the ratio based on the ratio and a previous ratio to generate a determination result; and
   calculating a filtered ratio by applying the first LPF to the ratio based on the determination result.

9. The method of claim 1, wherein the determining the preset gain value comprises:
   determining a target gain value among a plurality of preset gain values based on the ratio.

10. The method of claim 1, wherein the setting the assistance torque value comprises:
    determining whether to apply a second LPF to the assistance torque value based on the assistance torque value and a previous assistance torque value to generate a determination result; and
    calculating a filtered assistance torque value by applying the second LPF to the assistance torque value based on the determination result.

11. The method of claim 1, wherein the controlling the driver comprises:
    setting an output delay time associated with applying the assistance torque value; and
    controlling the driver to delay outputting the assistance torque value by the delay time.

12. The method of claim 1, wherein the controlling the driver comprises:
    controlling the driver based on an additional assistance torque pattern in response to the assistance torque value being maintained within a range.

13. The method of claim 12, wherein the controlling the driver comprises:
    controlling the driver to flex and extend an ankle of a user of the walking assistance apparatus based on the additional assistance torque pattern.

14. The method of claim 1, wherein the first pressure sensor and the second pressure sensor are associated with a sole of a foot of a first leg of a user, and the controlling of the driver comprises:
    controlling the driver such that the driver assists a second leg of the user, the second leg being different from the first leg.

15. The method of claim 1, wherein the controlling the driver comprises:
    controlling the driver of the walking assistance apparatus to output the assistance torque value to change an angle of an ankle of a user of the walking assistance apparatus.

16. The method of claim 1, wherein the controlling controls the driver of the walking assistance apparatus to output a force to an ankle of a user to assist with dorsiflexion motion of the ankle of the user based on the assistance torque value such that the assistance torque is provided to the ankle of the user by the driver without determining a gait phase of the user.

17. A non-transitory computer-readable medium comprising computer readable instructions that, when executed by a computer, configure the computer to perform the method of claim 1.

18. A walking assistance apparatus configured to provide an assistance torque to an ankle of a user, the walking assistance apparatus comprising:
    a memory configured to store a program; and
    a processor configured to execute the program to,
        receive a first pressure value and a second pressure value from a first pressure sensor and a second pressure sensor, respectively, calculate a ratio between the first pressure value and the second pressure value, determine a preset gain value based on the ratio, determine a gain adjusted ratio as a product of the preset gain value and the ratio between the first pressure value and the second pressure value, set an assistance torque value as the gain adjusted ratio, and control a driver to output the assistance torque value such that the assistance torque is provided to the ankle of the user by the driver.

19. The walking assistance apparatus of claim 18, wherein the processor is configured to control the driver to output a force to the ankle of the user to assist with dorsi-flexion motion of the ankle of the user based on the assistance torque value such that the assistance torque is provided to the ankle of the user by the driver without determining a gait phase of the user.

20. A walking assistance apparatus configured to assist walking of a user, the walking assistance apparatus comprising:

a first pressure sensor and a second pressure sensor configured to generate a first pressure value and a second pressure value, respectively, by sensing pressure values of a sole of a foot of the user;

a processor configured to, calculate a ratio between the first pressure value and the second pressure value, determine a preset gain value based on the ratio, determine a gain adjusted ratio as a product of the preset gain value and the ratio between the first pressure value and the second pressure value, and set an assistance torque value as the gain adjusted ratio; and a driver configured to output the assistance torque value.

* * * * *